United States Patent
Sieckmann

(10) Patent No.: US 9,859,939 B2
(45) Date of Patent: Jan. 2, 2018

(54) MICROSCOPE WITH WIRELESS RADIO INTERFACE AND MICROSCOPE SYSTEM

(71) Applicant: LEICA MICROSYSTEMS CMS GMBH, Wetzlar (DE)

(72) Inventor: Frank Sieckmann, Eppingen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 343 days.

(21) Appl. No.: 14/375,162

(22) PCT Filed: Jan. 30, 2013

(86) PCT No.: PCT/EP2013/051808
§ 371 (c)(1),
(2) Date: Jul. 29, 2014

(87) PCT Pub. No.: WO2013/113760
PCT Pub. Date: Aug. 8, 2013

(65) Prior Publication Data
US 2015/0029120 A1 Jan. 29, 2015

(30) Foreign Application Priority Data
Jan. 30, 2012 (DE) .................. 10 2012 201 278

(51) Int. Cl.
*H04Q 5/22* (2006.01)
*G05B 19/02* (2006.01)
(Continued)

(52) U.S. Cl.
CPC ........... *H04B 1/3877* (2013.01); *G02B 21/24* (2013.01); *G02B 21/241* (2013.01);
(Continued)

(58) Field of Classification Search
CPC .......... H04Q 5/22; G05B 19/02; G05B 23/02; H04B 1/20; G08C 19/12; G08B 5/00; G08B 5/36; A61B 19/00; A61C 1/00
(Continued)

(56) References Cited

U.S. PATENT DOCUMENTS 5,442,489 A 8/1995 Yamamoto et al.
5,834,759 A * 11/1998 Glossop .................. G01S 5/163
250/203.1
(Continued)

FOREIGN PATENT DOCUMENTS

CN 1507291 A 6/2004
CN 101251463 A 8/2008
(Continued)

OTHER PUBLICATIONS

Lord, et al., "Novel Uses of Smartphones in Ophthalmology", Ophthalmology, J.B. Lipincott Co., Bd. 117, Nr. 6, Jun. 1, 2010, pp. 1274-1274.e.3.
(Continued)

*Primary Examiner* — Nam V Nguyen
(74) *Attorney, Agent, or Firm* — Leydig, Voit & Mayer, Ltd.

(57) ABSTRACT

A microscope has a microscope control unit including at least one radio system having a wireless radio interface. The at least one radio system of the microscope control unit comprises: at least one first radio system configured to furnish at least one first radio characteristic and at least one second radio system configured to furnish at least one second radio characteristic, at least one radio system configured to furnish a first and a second radio characteristic in a predetermined time cycle, or both.

33 Claims, 11 Drawing Sheets

(51) Int. Cl.

| | | |
|---|---|---|
| *H04B 1/20* | (2006.01) | |
| *G08C 19/12* | (2006.01) | |
| *G05B 23/02* | (2006.01) | |
| *G08B 5/00* | (2006.01) | |
| *A61B 19/00* | (2006.01) | |
| *A61C 1/00* | (2006.01) | |
| *H04B 1/3877* | (2015.01) | |
| *G02B 21/24* | (2006.01) | |
| *G02B 21/36* | (2006.01) | |
| *G06F 3/01* | (2006.01) | |
| *H04L 29/06* | (2006.01) | |
| *H04W 4/00* | (2009.01) | |
| *H04W 48/18* | (2009.01) | |
| *H04W 88/06* | (2009.01) | |

(52) U.S. Cl.
CPC ......... *G02B 21/365* (2013.01); *G02B 21/368* (2013.01); *G06F 3/017* (2013.01); *H04L 69/168* (2013.01); *H04W 4/008* (2013.01); *H04W 48/18* (2013.01); *H04W 88/06* (2013.01)

(58) Field of Classification Search
USPC ............... 340/10.34, 4.31, 4.36, 4.42, 13.24; 455/41.2; 606/1, 126
See application file for complete search history.

(56) References Cited

U.S. PATENT DOCUMENTS

| | | | | |
|---|---|---|---|---|
| 6,131,296 | A * | 10/2000 | Fager | G01S 5/0247 33/1 CC |
| 6,262,837 | B1 * | 7/2001 | Nagano | G02B 21/06 359/368 |
| 6,272,235 | B1 * | 8/2001 | Bacus | G01N 15/1475 382/133 |
| 6,346,878 | B1 * | 2/2002 | Pohlman | G01S 13/36 340/10.1 |
| 6,549,115 | B1 * | 4/2003 | Daiss | B60R 25/24 123/179.2 |
| 6,612,981 | B2 * | 9/2003 | Onishi | H04N 7/181 348/E7.086 |
| 7,248,402 | B2 * | 7/2007 | Obrebski | G02B 7/001 359/368 |
| 7,388,466 | B2 * | 6/2008 | Ghabra | E05B 81/78 307/10.5 |
| 7,397,344 | B2 * | 7/2008 | Nantz | B60R 25/209 340/5.64 |
| 8,120,649 | B2 * | 2/2012 | Hashimoto | G02B 21/365 348/68 |
| 8,244,021 | B2 * | 8/2012 | Lett | G01N 21/6428 382/128 |
| 8,279,374 | B2 * | 10/2012 | Park | G02B 21/0008 348/80 |
| 8,947,517 | B2 * | 2/2015 | Yamane | G02B 21/365 348/79 |
| 8,994,509 | B2 * | 3/2015 | Gottlich | A61B 19/52 340/10.34 |
| 9,417,444 | B2 * | 8/2016 | Huang | G02B 21/06 |
| 9,454,896 | B2 * | 9/2016 | Hocke | A61B 90/20 |
| 2002/0140630 | A1 | 10/2002 | Vaccarelli | |
| 2006/0116667 | A1 * | 6/2006 | Hamel | A61B 17/32006 606/1 |
| 2010/0103253 | A1 * | 4/2010 | Sieckmann | G02B 21/367 348/79 |
| 2010/0297943 | A1 * | 11/2010 | Kaplan | H04W 52/283 455/41.2 |
| 2011/0085031 | A1 | 4/2011 | Park et al. | |
| 2011/0235168 | A1 | 9/2011 | Sander | |
| 2012/0120222 | A1 | 5/2012 | Lettow et al. | |
| 2012/0120223 | A1 | 5/2012 | Zuest et al. | |
| 2012/0120224 | A1 | 5/2012 | Zuest et al. | |
| 2013/0070336 | A1 | 3/2013 | Thomas et al. | |

FOREIGN PATENT DOCUMENTS

| | | |
|---|---|---|
| CN | 201741296 U | 2/2011 |
| DE | 19632281 A1 | 4/1997 |
| DE | 10245591 A1 | 4/2004 |
| DE | 102010003339 B4 | 2/2012 |
| DE | 102010043917 A1 | 5/2012 |
| DE | 102010043919 A1 | 5/2012 |
| DE | 102010063392 A1 | 5/2012 |
| DE | 102011082786 A1 | 3/2013 |
| EP | 2082700 A1 | 7/2009 |
| JP | 2010197819 A | 9/2010 |
| WO | WO 2006083081 A1 | 8/2006 |
| WO | WO 2008028944 A1 | 3/2008 |
| WO | WO 2011008209 A1 | 1/2011 |
| WO | WO 2011150444 A1 | 12/2011 |

OTHER PUBLICATIONS

Bowman, et al, Technical Note; iTweezers: optical micromanipulation controlled by an Apple iPad; Journal of Optics, vol. 13, Nr. 4, pp. 44002, Mar. 4, 2011.

* cited by examiner

ND WIRELESS RADIO
MICROSCOPE WITH WIRELESS RADIO INTERFACE AND MICROSCOPE SYSTEM

CROSS-REFERENCE TO PRIOR APPLICATIONS

This application is a U.S. National Phase Application under 35 U.S.C. §371 of International Application No. PCT/EP2013/051808, filed on Jan. 30, 2013, and claims benefit to German Patent Application No. DE 10 2012 201 278.8, filed on Jan. 30, 2012. The International Application was published in German on Aug. 8, 2013 as WO 2013/113760 under PCT Article 21 (2).

FIELD

The present invention relates to a microscope having a microscope control unit that comprises a radio system having a wireless radio interface, and to a microscope system having at least one such microscope.

The present invention also relates to the integral connection of microscopes and an improvement in the operating concept of microscopes. It has been recognized in this context that mobile user devices, for example an iPad, an iPhone, or a tablet PC, already possess all the technologies necessary in order to become a communication system for a microscope. In addition, many new advantages would be obtained if standardized wireless communication with any user devices were made possible for microscopes.

The degree of interconnection among different communication system is nowadays constantly increasing. Data sources are increasingly often being addressed via highly mobile, wirelessly connectable user devices. Users can therefore at any time access information, link into sub-networks, and communicate with one another.

Users communicate at present, for example:
via user devices that are wirelessly and flexibly connectable;
via user devices that function worldwide, since the technology is standardized;
among one another, for example, via e-mail, voice, SMS, MMS;
with the Internet (information, movies, images, etc.);
with their own PC (e.g. for data synchronization);
and they use applications (so-called "apps" from the Apple Store).

The emphasis hitherto has been on human users, and these are often people exchanging data with one another.

The present invention, in an embodiment, is an extension of this idea to machines, in particular to microscopes. The intention is thereby to allow users to connect wirelessly to microscopes, control them, store data such as images and metadata on their user device, automatically adjust microscope functionality to their needs (automatic process switchover), exchange data with colleagues, etc.

BACKGROUND

The Chinese utility model CN 201741296 U discloses a network-based training interaction system for microscopes in which various student microscopes having a Wi-Fi function can be connected to a wireless mesh network. The trainer system likewise encompasses a microscope that is connected to the mesh network. The microscopes are digital microscopes having digital cameras for image acquisition. WO 2011/150444 A1 relates to a mobile telephone having a camera having an image sensor and optical system, and having a display, a microscope lens being introduced into the optical path in order to reduce the depth dimension of the optical system in the mobile telephone.

Bodelin Technologies markets, under the trade name "PROSCOPE MOBILE," a handheld microscope that can be connected via Wi-Fi, for example, to an iPad, iPhone, or iPod Touch so that microscope images can be displayed on the user devices just recited. The microscope image can be displayed simultaneously on multiple Apple devices.

A similar product is marketed by the Japanese company Scalar Corporation under the trade name "AirMicro." A corresponding app on the Apple device creates the connection to the handheld microscope. Live images can be displayed; individual images can be saved. The optical system of this handheld device is protected by U.S. Pat. No. 5,442,489.

With the handheld microscopes recited, image display occurs via the aforesaid Apple devices but the handheld microscope is controlled only via corresponding buttons or operating panels on the microscope.

DE 10 2010 003 339 B4 relates to a sterile operating unit having a sensor screen, for a medical device such as a surgical microscope. The operating unit encompasses a touchscreen having a touchscreen surface for the presentation of image material, the touchscreen being operable in noncontact fashion and being embodied to receive a sterile transparent operating surface in front of the touchscreen surface. The sensor screen according to the patent is consequently a touchscreen operable in noncontact fashion, the sensor screen surface being equipped, for example, with a transparent sterile or sterilizable operating surface (panel made of glass or plastic). The sensor screen surface contains regions that are provided for controlling functions of the microscope device, for example X, Y, or Z displacements, zoom adjustments, focusing, etc., and also for fading additional information in and out, controlling apertures as well as brightness and contrast, etc.

DE 10 2010 043 919 A1 discloses a portable microscope having an integrated operating unit for selecting or adjusting at least one electrically controllable microscope function. The operating unit has for this purpose at least one touch sensor for sensing inputted user instructions, the touch sensor being arranged on the portable microscope in such a way that the user can both hold and operate the microscope with one hand. All microscope functions, such as alignment, zooming, focusing, or triggering image acquisition, can thus be activated without shifting the hand or using the other hand, and without mechanical operation of, for example, pressure-sensitive operating elements, and thus without vibration and blurring. User inputs on the touch sensor encompass tapping or drawing or swiping motions of a finger.

DE 2010 043 917 A1 discloses an operating unit for a microscope for selecting and/or adjusting at least one electrically controllable function of the microscope, the operating unit comprising at least one touch sensor for sensing input instructions and being embodied to be carryable with one hand, the touch sensor being arranged so that the operating unit can be held and simultaneously operated by a user using only one hand.

DE 10 2011 082 786.2 with the filing date of Sep. 14, 2011, of Leica Microsystems (Switzerland) AG, entitled "Microscope device having a gooseneck operating unit," discloses an operating unit for a microscope, the operating unit being carried by a flexible gooseneck mount and comprising, for example, a touchpad or touchscreen. By means of the flexible gooseneck, the position of the operating unit can be very easily adapted by the operator to a position suitable for him, in particular suitable for a right- or left-hander. To allow a small and lightweight embodiment of the operating unit, the operating elements of the operating unit can be separate from the control electronics. The connection between the operating unit and the control electronics can also be embodied wirelessly.

DE 10 2010 063 392 A1 discloses a microscope having a sensor screen, the microscope comprising an image acquisition device set up for optical and digital sensing of an object to generate an object image, as well as a sensor screen embodied to display the object image in a display region and to sense inputs in that display region. Based on the inputs of a user sensed in said display region of the sensor screen, microscope functions can be activated, i.e. settings of motorized and/or electrically controllable microscope components can be modified. This makes it possible to effect inputs on the display region of the sensor screen within the displayed object image. Depending on the type of user input, the settings of said microscope components can be modified. These include, for example, the image acquisition sensor, an image processing device, an objective turret, a motorized zoom adjuster, a focusing drive, and/or a microscope stage. The type of user input and the mode of the display region determine the microscope component to be controlled and the magnitude of the change in setting. A specific control instruction, such as a translation, zoom, rotation, or focusing instruction, can be detected from the type of input. Corresponding control instructions for the microscope components are derived therefrom. These control instructions then result in a corresponding adjustment of the microscope component, for example in a translation of the microscope stage, zooming of the motorized zoom adjuster, a microscope stage rotation, or focusing by means of the focusing drive. The input instruction types encompass inputs using one or several of the user's fingers on the display region of the sensor screen; the surface can be contacted, or the finger or fingers can be positioned or moved in the vicinity of the surface.

Existing art with regard to radio-based systems:

In existing technologies, mobile user devices that are connected to specific providers, with emphasis usually on human communication and interaction, are used.

Wireless data output devices are, for example:

telephones, for example the iPhone;
viewers and working systems, for example the iPad, tablet PCs;
wireless printers.

Wireless data input devices are, for example:

a wireless keyboard;
a wireless mouse;
an iPad, iPhone, or other mobile user device.

Data providers are used, for example, to retrieve data from a server;
to store data on a server;
to mutually exchange data;
to mutually synchronize data.

Software development kits are required, for example, in order to write "apps";
write software applications or drivers;
integrate new functions.

The existing art with regard to microscopes does not at present emphasize people.

Operating elements in microscopes are rigidly and inflexibly installed; very few adaptation possibilities without considerable effort and cost; no capability with regard to data protection; difficult to operate in a dark laboratory; no user- and application-dependent process switchover; no automatic user detection; no facility capability; no built-in intelligence ("smart concepts"), etc.

The inventor has identified the following disadvantages of microscopes currently on the market:

| Context | Present-day restrictions on microscopes and delivery systems |
| --- | --- |
| Microscope itself | many internal components that, as manufactured, can essentially communicate with one another only internally; the manufacturer must write all of the control software in order to allow a microscope to be controlled; no provision is made for input of data via an already existing standardized interface (Bluetooth, WLAN, UMTS, LTE, etc.); no provision is made for output of data via an already existing standardized interface (Bluetooth, WLAN, UMTS, LTE, etc.); a user cannot be automatically wirelessly logged into a microscope for operating purposes; there is no logging of user identification data (when did a particular user use the microscope?); central management of a fleet of microscopes (e.g. in a screening facility), with automatic user login and user management, is possible only with difficulty; it is not possible to grant to specific users only specific rights to operate specific microscope properties; easy "portability" of the data generated is not possible, but instead usually requires at least one connected PC; successful microscope setting data cannot be exchanged between users; no disabled-accessible design; no illuminated operating elements (a disadvantage in dark laboratories); no color displays with adaptation to accommodation capabilities of the human eye (very bright display background). |
| User | microscope is not easy to operate; data exchange is not easy; no automatic login with process switchover; no operating environment or operating concept familiar to the user, e.g. via a reusable application on his iPad; no easy way to exchange data and control protocols with colleagues; no uniform operating concept that correlates with previously known methods and user devices; no security for confidential data; no easy operation of standard situations in microscopy; no easy adaptation of the operating concept for disabled users; no easy adaptation of the operating concept when process switchover occurs. |
| Manufacturer | no capability for ad hoc integration of new functions into the microscope-side display; no universal operating concept (microscopes often differ in terms of operating philosophy); small adaptations require a great deal of time and therefore cost; no standalone systems (a PC is usually required); only limited facility capability; disregard for human sensory perceptions (light/dark adaptation times, clearly coded illuminated operating elements, support for sense of touch, e.g. feeling the switching point when pushing a button. |
| Facility manager | difficult to manage multiple systems; no uniformly defined concept; numerous individual solutions on the market; difficulty in granting permissions; "rent-a-microscope" difficult to manage; simultaneous control of multiple microscopes is not possible (high content screening using multiple microscopes in order to increase throughput) |

The technologies known to the inventor moreover have disadvantages with regard to the management and generation of standardized metadata protocols, and thus also for quality assurance of the data generated.

In data acquisition, the relevant microscope data are not written to a server or into a database as soon as a microscope is without a PC. Even with a PC, only insufficient data are generated;

central management and acquisition of quality features is not possible;

completed experiments cannot be documented for quality assurance purposes, in particular by recording log files indicating which microscope components were used, and specifically in what way, for the experiment.

Because of the limitations indicated, present-day microscopes cannot be seamlessly integrated into existing laboratory environments, nor does a capability exist for universal utilization of microscopes without a PC with regard to acquisition of the data generated with the microscope.

SUMMARY

In an embodiment, the present invention provides a microscope having a microscope control unit. The microscope control unit includes at least one radio system having a wireless radio interface. The at least one radio system of the microscope control unit comprises: at least one first radio system configured to furnish at least one first radio characteristic and at least one second radio system configured to furnish at least one second radio characteristic, at least one radio system configured to furnish a first and a second radio characteristic in a predetermined time cycle, or both.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
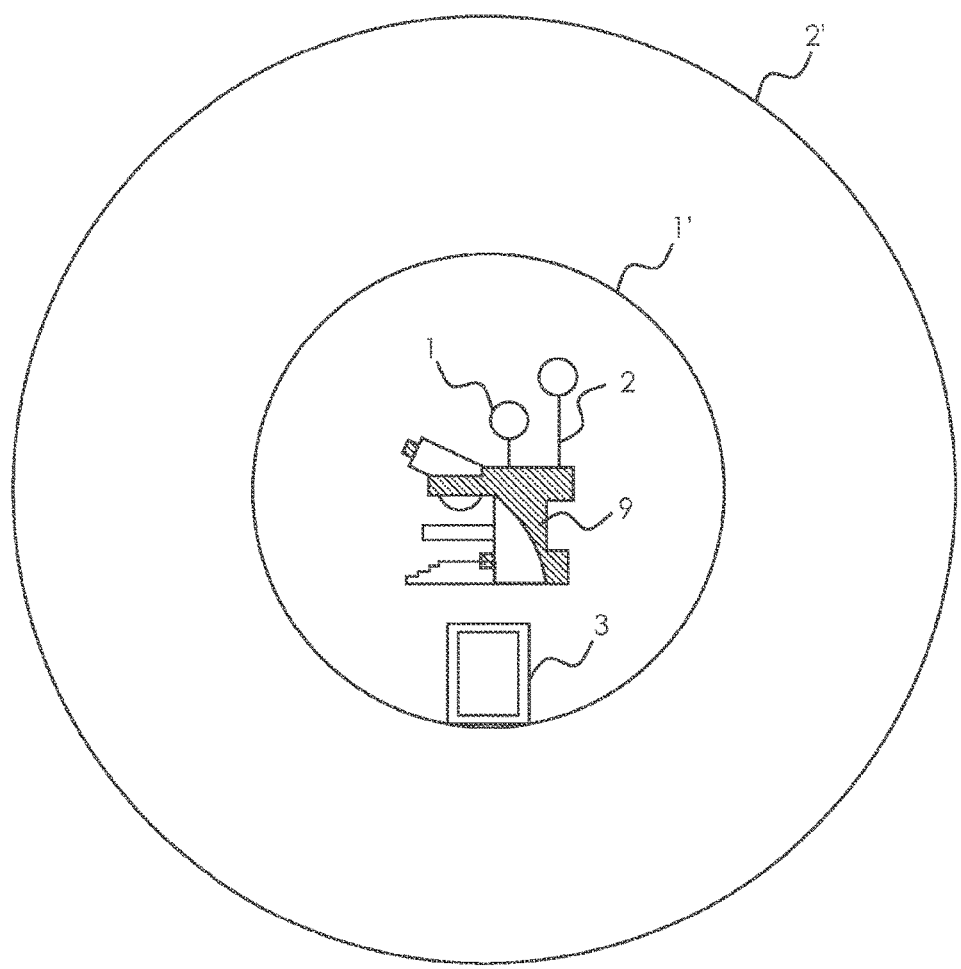
FIG. 1 schematically shows the basic idea of the present invention.

In an embodiment, the present invention provides a new operating concept for microscopes and enables novel operating concepts with which the disadvantages described above can very largely be overcome.

The microscope according to an embodiment of the present invention possesses a microscope control unit that comprises a radio system having a wireless radio interface using a transfer standard, such as near-field communication (NFC), Bluetooth, WLAN, or UMTS. The microscope control unit comprises at least one first radio system for furnishing at least one first radio characteristic, and at least one second radio system for furnishing at least one second radio characteristic. Additionally or alternatively, the microscope control unit comprises at least one radio system that is set up, by means of a timer, in such a way that it furnishes at least one first and one second radio characteristic in a predetermined time cycle. Further embodiments are evident from the corresponding dependent claims and the description below. The invention further relates to a microscope system having at least one microscope according to the present invention and having at least one (mobile) user device, such as an iPad, iPhone, smartphone, BlackBerry, tablet PC, or laptop, control of the at least one microscope occurring at least in part via at least one mobile user device that is coupled via the wireless radio interface to the microscope that is to be controlled. Further embodiments of the microscope system are evident from the corresponding dependent claims and the description below.

The second radio system can be, for example, an ordinary radio system, while the first radio system makes available, for example, an access point (AP) which identifies itself to the user via an informative name (APN=access point name) and which the user can then select on his mobile user device as a system to be controlled (preferably a microscope; e.g. "microscope 4711").

The operating convenience of a microscope is intended to be appreciably simplified by way of the features according to embodiments of the present invention recited hereinafter. This is to be accomplished by automatic establishment of a connection between the user device (e.g. iPad, etc.) and the microscope (login request).

Once the new user is logged in, then
the microscope can be automatically adjusted (automatic process switchover);
a login message can be sent to the facility manager
for example, so that the operating duration of the microscope can later be billed,
specific permissions can be switched to the microscope, or
a data memory can be made available as agreed.

If the haptic, visual, or acoustic capabilities of the user are limited, this can be compensated for as follows in the context of the invention:

Haptic limitation:
The operating elements of the microscope are remotely controlled by radio and via the touchpad. A user who must sit in a wheelchair, for example, could then control the microscope by placing the iPad or another mobile user device on his lap.

Visual limitation:
The visual limitation can be eliminated by visual feedback of the system status and of the acquired images onto the external control unit (e.g. iPad), by way of an advantageous and individual configuration of the user interface (e.g. magnified display of the operating elements).

Acoustic limitation:
The limitation can be partly eliminated by audiovisual adaptation of the external control unit to the user's needs.

A further intention in the context of the invention is to enable the operating elements of a microscope to be optimally adapted to the particular method being used. This is often possible only to a limited extent when adjusting elements on microscopes are permanently "anchored." Adapting the operating concept of a microscope to the currently selected method is moreover very expensive to accomplish. It is achieved, for example, by way of an automatic, context-dependent adaptation of the operating elements to the control unit (e.g. on an iPad).

The "rent-a-microscope" concept can be realized because the microscopes that are to be controlled by the user by utilizing his user device (iPhone, iPad, tablet PC) can coordinate, via radio or LAN, with a "central office." This can be, for example, the facility manager. The facility manager can thereby record the duration and type of microscope utilization for subsequent billing purposes.

Sensitive experiments and data can be transferred in encrypted fashion using the concept, so that data protection is guaranteed.

Thanks to the definition (design, installation) of a standardized interface, it is possible to adapt modern input and output media, such as an iPad, iPhone, tablet PC, and the like, for the purpose of simple wireless interaction with the microscope. In particular, users can log into the microscope wirelessly via check-in, simply by being in the vicinity of the microscope. User information can be transferred wirelessly in this context, for example in order to automatically establish the correct method on the microscope or, in the context of a facility manager, to retrieve the agreed permissions for the use of specific microscope properties ("rent-a-microscope"). Using mouse gestures, standard microscope functions can be appreciably simplified and can be entirely redefined in conjunction with technologies combining gestures and operation of the microscope. People with disabilities can receive an adapted user interface (UI) as well as gestures which are adapted to their needs and which they can perform; illuminated displays (e.g. reverse-illuminated: white text on a black background) make it easier to work in the dark; and thanks to an Internet connection the user can be automatically and intelligently supported in his work ("smart device"); and much more.

The following embodiments will be presented in summary fashion:

Add to the microscope a uniform wireless radio interface, corresponding to international standards, Enable combined control of the microscope by multiple user devices, and control elements mounted on the microscope, that are connected via radio Enable control of multiple microscopes ("microscope cluster") by a wirelessly connected control device for purposes of simultaneous setup and execution of an experiment Exchange microscope metadata (all available) with mobile user devices and with databases that are likewise connected via radio Ability to block specific microscope functions in the interest of controlled permissions (user rights management)

Enable continuous linkage of an input or output device to a microscope in wireless fashion, for example a specific input device can then no longer be linked to a different microscope, thereby preventing simultaneous (and possibly contradictory) control of the same component by two user devices Interaction between wireless user devices and a manager (facility manager, factory manager, automated machinery), with the capability for controlled manipulation, blockage, or updating of the devices.

Detection of user devices and input devices as a function of radio field strength, and optionally automatic login request on the user device's display Using an active access point built into the microscope, a user device (e.g. an iPad) can be directly linked to a specific microscope in controlled and unique fashion Using a Bluetooth interface present in the microscope, a user device (e.g. an iPad) can be directly linked to a specific microscope in controlled and unique fashion.

DETAILED DESCRIPTION OF AN EMBODIMENT OF THE INVENTION a. The Basic Idea

According to an embodiment of the present invention the microscope control unit of the microscope comprises one or more built-in radio systems. The intention is to furnish two different radio characteristics. This can be achieved ether by way of two built-in radio systems having different radio characteristics, or by way of a single built-in radio system that respectively furnishes one of two different radio characteristics in a predetermined time cycle. It is also conceivable for the two radio systems each to furnish one of two different radio characteristics in a predetermined time cycle. Proceeding from these ideas, the invention can be generalized to state that more than two radio characteristics are furnished, for example by way of more than two radio systems, or by timed cycling between the more than two radio characteristics, or lastly by way of a mixed form, i.e. multiple radio systems of which at least one is operated in cycle-timed fashion.

An ordinary radio system for linkage to an existing radio network, and an active access point for the purpose of directly linking a control device or output device (e.g. an iPad), are advantageous, as explained below in further detail.

In the context of this Application, a "radio characteristic" refers to a characteristic property of the radio system belonging to the respective microscope. The radio characteristic is thus intended to make possible largely confusion-free, optimally unique communication with the relevant radio system of the microscope, e.g. by the fact that a microscope makes an active access point available. A radio characteristic can be constituted by one or more features of a radio system, such as range, signal (frequency, amplitude, and modulations thereof, etc.), IP and port addresses, and/or the shape of the radio field (field characteristic).

It is advantageous if the first radio characteristic is characterized at least in part by a first range and the second radio characteristic at least in part by a different second range, the first range in particular being shorter than the second range. It is particularly advantageous here if the first and/or second range is/are adjustable.

For example, at least one radio system (transmission, reception) having a short range (for example, approx. 1 to 3 m; adjustable) can be built into the microscope (e.g. as an active access point or a Bluetooth system). This can be used for communication with at least one input device connected externally via radio, and/or with at least one output device connected externally via radio, and/or for communication with multiple systems connected to a radio bus.

At least one radio system (transmission, reception) built into the microscope, having a long range (range longer than the short range, in particular longer than 3 m, in particular more than 5 m or more; in particular adjustable), can be used in particular for at least one connection to a central data manager. This includes, for example, as will be explained later in further detail, the service manager, facility manager, input/output manager, data manager, security manager, or quality manager.

Support for or provision of at least one standard protocol, such as NFC, Bluetooth, WLAN, UMTS, or LTE, is advantageous, respectively for the radio system or systems in order to furnish a first and second radio characteristic, i.e. for example for the near region and the far region. The radio system can consist in the fact that the microscope itself makes an active access point available.

The radio system having a first radio characteristic (i.e. for example a first (short) range) preferably supports at least one standardized protocol in order to exchange microscope metadata. This occurs preferably in the form of an XML file (e.g. OME.XML or an XML file specifically defined for this purpose). Metadata can be: operating duration, method established, microscopy methods available, etc. These metadata, as well as the settings data, can be permanently buffered in a persistent memory unit in the microscope.

The radio system having the first radio characteristic (e.g. the one having the access point) (e.g. first (short) range) furthermore supports at least one standardized fast protocol for current microscope status data, for example for fast updating of external devices (e.g. transfer of the current stage position) or for fast control of the microscope and its components by input devices.

The radio system having the second radio characteristic (for example a second (long) range) preferably supports at least one standardized fast protocol for active data exchange, for example for the following purposes:
  logging into the microscope
  "rent-a-microscope" management
  rights management
  quality management
  data stream, e.g. storing acquired images in an external memory (which can also be a memory cloud on the Web or in the local network)
  Web access.

It is advantageous to add a parallel control port to each of the microscope-relevant actuators for controlling microscope components, e.g. the actuators for adjusting the Z position (focus drive) or X, Y position (microscope stage), brightness control actuators, etc. These actuators can then additionally be controlled in parallel very quickly via external input devices connected by radio.

The advantages of furnishing at least two different radio characteristics per microscope will be explained below, with no limitation as to generality, on the basis of an example in which a microscope is equipped with one short-range radio system and one long-range radio system.

When a radio-capable system, in particular a mobile user device (such as an iPad) enters the region of the short-range radio system, the microscope can establish contact with the user device. Alternatively, the user device can establish contact with the microscope via the microscope-side access point. A corresponding request to the user to log into the microscope can then appear on the user device. Alternatively, the microscope can automatically "recognize" the user device and thus the user.

Alternatively or additionally, the field characteristics can also differ, including, for example, as a result of the shaping of the transmission/reception field or by using a unique IP address and a unique port address.

When multiple microscopes are present, the transmission/reception field can advantageously be shaped in such a way that the fields of multiple microscopes do not, or do not significantly, overlap, so that crosstalk to adjacent microscopes is effectively precluded. In the case where the microscope-side access point is used, a direct and confusion-free link between a user device and a microscope can be effected.

The current linkage status can be indicated to the user, for example, by way of a clearly detectable signal (e.g. one or more LEDs on the microscope). The short-range radio system should be activated at least at specific time intervals, especially when no work is being done at the microscope, in order to allow detection of the presence of the user (or his user device). If the presence of the user cannot be detected, after a predefined time period the microscope can then be put into a "sleep" mode from which it can be transferred back into the working mode only by the user (with his user device). It is thereby possible to ensure that when the authenticated user is absent, another user cannot work at the microscope in unauthorized fashion.

A typical check-in procedure could be as follows: For example, a user rents, for a specific investigation, a microscope that is enabled for that user after payment is received, possibly being limited to specific uses ("rent-a-microscope"). The two radio characteristics according to the present invention now ensure not only authentication of the authorized user, but also subsequent stipulation of a framework within which the user can work at the microscope. This includes, in particular, the establishment of parameters of a user-specific microscopy method (for example, the parameters of the microscopy method most recently utilized by that user are re-established), and storage of the image data of the microscopy images that are acquired. The data exchange required for this can be performed with a central data server, in particular via a data cloud.

For authentication the microscope detects, in particular automatically, the user device of the enabled, authorized user on the basis of the first radio characteristic. The latter is furnished in particular by a short-range radio system (NFC or Bluetooth). WLAN can also be used, in which case it can be useful, because of the longer range, to request a password from the user. Only after input of the correct password is the microscope enabled for that user.

Subsequent work at the microscope is supported and made possible by the second radio characteristic according to the present invention. For this, data for user-specific setup of the microscope are downloaded, and/or corresponding settings are stored, and/or acquired image data are centrally saved, by a central data server via radio (in particular UMTS, LTE, or WLAN). The aforementioned procedure is particularly advantageous especially for rental of a very expensive microscope, or when highly confidential user-specific data are involved.

In the context of this Application, the term "microscope" is intended to encompass not only the microscope itself but also upstream and/or downstream systems. Upstream systems can be, for example, processes that prepare tissue samples for microscope investigation (staining, sectioning, etc.). Downstream systems can be devices that, for example, perform image processing on the acquired microscope images. Because the nature of the microscope investigation (e.g. fluorescence microscopy) often depends on the preceding type of sample preparation (e.g. staining the sample), and because downstream evaluation of the microscope data (e.g. processing of fluorescence images) usually in turn depends on the nature of the microscopy method, it is useful not to consider only the microscope as such, but instead to incorporate the upstream and downstream systems. The term "microscope" must therefore be understood comprehensively in the context of the present invention.

b. Intercommunication

The invention presented here is intended, inter alia, to be capable of being used later in a microscope facility (microscope system), in such a way that any user can wirelessly contact and control any microscope using his user device.

Essential elements in this context are "wireless," "monitored," "simple," and "flexible." For example, a user who wishes to use a microscope in a facility can check in with a facility manager. He is then issued a virtual "key" for one or more microscopes. As soon as the user has logged in, a clock in the facility manager starts, recording the utilization time of the microscope for the purpose of subsequent cost-based billing ("rent-a-microscope"). A lump sum for a specific utilization period could also be "paid" via NFC in the context of usual billing methods. The mobile user device then functions as a kind of credit card.

Once the facility manager has released a microscope, the user can proceed, along with his control system (e.g. his iPad), to that microscope. As soon as he has come sufficiently close, an automatic login occurs or a welcome message appears on the display of his iPad, with the request to check in using the key obtained from the facility manager. The user can then begin his experiment.

In the simplest case a permanent key is issued, so that the entire system can also be used as an individual microscope.

It is also possible to stipulate how many mobile devices are permitted to link to the microscope. In specific cases, for example, this may be only a single user device (for example so that sensitive data and settings can be unequivocally controlled); in other cases contact with multiple mobile devices can be allowed (for example so that data generated by the microscope can be viewed concurrently).

According to an advantageous embodiment, these capabilities are achieved substantially, for example, by way of the following three technical steps (steps 4 and 5 are optional):

Step 1: Add a "usual," long-range wireless LAN to the microscope
  Alternatively, this connection could also be cable-based (network cable connection)
  Alternatively, a UMTS or LTE network could also be utilized.
Step 2: Add a microscope-integrated short-range WLAN router to the microscope
  Alternatively, an NFC and/or Bluetooth radio system and/or an access point
  for wireless connection of external input/output devices.
Step 3: Add a very fast data transfer protocol to as many microscope actuators as possible.
Step 4: Add a rights management system to all microscope actuators.
Step 5: Add a quality management system to all microscope actuators.

c. Adding a "Usual" WLAN Connection and a WLAN Integrated on the Microscope Side, Each Having a Fast Data Transfer Protocol for the Microscope Actuators, to the Microscope Explanation regarding "microscope actuators":

The microscope actuators are used to control all subassemblies or components within the microscope that ensure operation of the microscope, in particular the execution of experiments. These include, for example:
  microscope stage (X, Y position) (with meta-information (manufacturer, accuracy, operating time, etc.))
  Z drive or focusing drive (Z position) (with appropriate meta-information)
  camera (with meta-information (manufacturer, bit depth, camera data, etc.))
  filter wheels (with meta-information (manufacturer, cut-on, cutoff, filter characteristics curves, etc.))
  AOBS, AOTF (with meta-information . . . )
  ports (with meta-information . . . )
  laser (intensity, activation status) (with meta-information . . . )
  illumination unit (lamp output, shutter, etc.).

Each microscope actuator can comprise two information blocks:
  status information (e.g. current status (e.g. current stage position, etc.))
  meta-information (manufacturer, stage accuracy, spindle pitch, etc.)

Explanation regarding "usual WLAN":

What is meant by a "microscope-integrated" WLAN is that this WLAN is an independently operable WLAN, not dependent on the rest of the WLAN network, which is made available by the microscope itself, namely by its radio system. The microscopes can therefore also act autonomously, i.e. in environments in which there is no additional WLAN. This functionality is made available by a so-called "access point" (AP). An access point name (APN) ensures that the microscope can be recognized in a facility by way of a human-readable name. The names of all access points available in a vicinity (i.e. of the microscopes that offer such a service) are indicated on the display of the mobile user device (e.g. an iPad) that is to be connected, and can be selected by the user. After selection, the mobile user device creates a connection to the microscope.

A "usual" WLAN means one that is a general WLAN network external to the microscope, as made available in many enterprises. This is therefore the conventional understanding of a WLAN.

The present invention therefore distinguishes between two types of WLAN:
  microscope-side WLAN—service is integrated into the microscope (short range)
  general WLAN—service is offered by the facility (long range).

If a general WLAN is available, the commands of the microscope-side WLAN can be passed on by proxy to the general WLAN.

In order to allow microscopes to be controlled via external input and output devices (e.g. by an iPad), very fast communication must take place between the microscope and the external device.

A separate WLAN that is made available by the microscope and is independent of the rest of the WLAN has very great advantages. For example, data flows are not slowed down by any additional data traffic. If data transfer were accomplished via the in-house WLAN, conversely, all transactions would need to share the performance of the WLAN with the other connected systems. The use of a separate WLAN service integrated into the microscope, however, ensures that the required data rate is always attained. It is also possible to ensure data security, provided an encrypted connection is created.

FIG. 1 schematically shows the basic idea of an embodiment of the present invention. A microscope is equipped with two radio systems 1 and 2 (WLAN, Bluetooth, AP, NFC, or the like). The microscope is labeled 9. First radio system 1 is radio system having a short range 1'; second radio system 2 is a radio system having a long range 2'.

As soon as a radio-capable system, in this case a mobile user device 3, for example an iPad, comes into the vicinity of the short-range radio system, microscope 9 makes contact with the user system or user device 3. A corresponding message prompting the user to log into microscope 9 would now appear on the iPad.

The prompt to log in can be further limited, and its execution determined, by a central data manager, for example a facility manager or a security manager that will be discussed later.

Be it noted that instead of the two built-in radio systems 1 and 2, it is also possible to use a single radio system that switches back and forth between two ranges 1' and 2' on a certain cycle (e.g. once per second) by varying its field energy. The radio system that wishes to log in to the microscope (e.g. iPad 3) could then be detected as follows.

Assume that iPad 3 is firstly located in region 1' and 2': When the system switches to short range 1', iPad 3 is detected. When the system switches to long range 2', iPad 3 is likewise detected.

If iPad 3 is located in region 2' outside 1': When the system switches to short range 1', iPad 3 is not detected. When the system switches to long range 2', however, iPad 3 is detected.

It is thus possible to determine unequivocally whether the radio system that wishes to connect to microscope 9 is located in the region of first range 1' or in the region of second range 2'. Only a single radio system, alternating in terms of its range, is therefore required on microscope 9.

In general and in this exemplifying embodiment in particular, the above-described radio system 1 having a short range 1' can in particular support the NFC format. As already stated, "NFC" stands for "near field communication," and represents an international transfer standard for noncontact exchange of data over short distances (from a few centimeters to less than a meter). This technology has hitherto been used principally for cashless payment of small amounts. The use of the NFC standard can be particularly advantageous for creating communication between a wireless input system, for example an NFC-capable mobile user device, and microscope 9. As soon as the person having the mobile user device comes sufficiently close to microscope 9, communication can automatically be established. In this context, data are exchanged between the NFC-capable mobile user device 3 and microscope 9, with the result that the microscope "recognizes" that an authorized user is located in its vicinity. Payment for the service can also be made via NFC ("rent-a-microscope").

Another exemplifying embodiment can utilize the access point integrated into the microscope to create the aforesaid direct radio connection between the mobile user device and the microscope, and to exchange data that enable an authorization test of the user.

In this case the microscope can, for example, carry out the following steps:

Negative recognition: No authorization for relevant microscope sectors, in particular no authorization for memory units or operating units (see also exemplifying embodiments below).

Positive recognition: Automatic authorization of user for relevant microscope sectors (which are defined administratively (see exemplifying embodiments below)), in particular authorization for operating elements, memory units, functional modules (camera, stage, microscopy methods, etc.), security settings (data protection), automatic method settings (microscope adjusts itself in accordance with what has been saved by the current user or one of his colleagues; for example, microscope adjusts itself to be as it was the last time it was used by the user, or as required for the desired experiment, or as it had been adjusted previously by a colleague of the user's). Data routes and memory locations for the data are automatically routed. An automatic payment service can be activated (charging rental costs for the microscope, or for the microscopy method used, to a user account); in particular, the possibility exists of extending the rental period, for which purpose a corresponding request can be sent to the facility manager, which can accept or reject the request. Alternatively, the request can also be sent to a database. See also the exemplifying embodiments below regarding the aforesaid possibilities.

Positive and negative recognition: This instance can occur when two or more NFC-capable user devices are located in the sensing region of radio system 1. As soon as at least one NFC-capable user device is positively recognized, the aforesaid recognition procedure is carried out.

Multiple positive recognitions: This instance can occur when two or more NFC-capable user devices are located in the sensing region of radio system and are recognized as positive. In this case a database can be queried, or a request can be sent to the facility manager, as to how to proceed. The result can be, for example, that all users are authorized concurrently, one user is selected and authorized, or no users are authorized; in the latter case in particular, a message should be sent via a display or an acoustic notification to the users, asking that an administrator or the facility manager be consulted in order to clarify authorization. Further explanations regarding these exemplifying embodiments may once again be gathered in particular from the exemplifying embodiments presented below.

Figure 2:
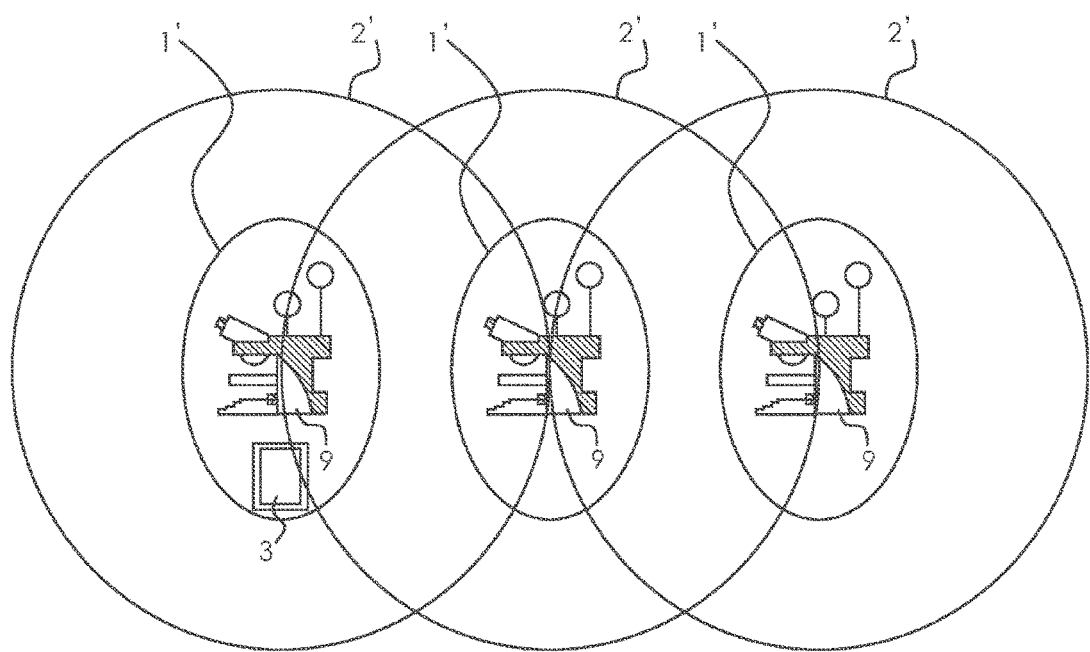
FIG. 2 shows the example of three microscopes in a microscope system, the field characteristics being correspondingly shaped so that overlaps are avoided as much as possible.

FIG. 2 shows the example of three microscopes in a microscope system.

The embodiment discussed above, with two microscope-side radio systems 1 and 2, has the further advantage that the input and output devices can also be uniquely assigned to different microscopes if multiple microscopes 9 are located in a room. One such example is depicted in FIG. 2. For example, the linkage of a mobile user device to a microscope access point is unique.

This can be achieved by adapting the first radio characteristics, i.e. in particular, for example, by adapting first ranges 1' and/or by shaping the transmission/reception field and/or by using unique IP addresses and unique port addresses and/or by using a microscope-side access point.

As is evident from FIG. 2, instead of a spherical field (see FIG. 1), the transmission/reception field in particular of first radio system 1 can advantageously be configured so that what results is a lobe-shaped (elliptical or oval) field configuration having a first range 1', in such a way that the fields having first range 1' of multiple microscopes 9 are not, or are not significantly, superimposed, thereby precluding crosstalk between the individual microscopes 9.

This yields a radio cell system similar to the mobile-telephone network. In the case of a microscope 9 according to FIG. 1, however, this system has two cells: a large cell (range 2') and a very small cell having a substantially shorter range 1' ("nanocell").

As soon as a linkage between a mobile user device 3 and a microscope 9 has taken place, the switchover between the two ranges 1' and 2', more generally the switchover between the first and the second radio characteristic, can be switched off.

The current linkage status to the external control device (mobile user device 3) can be displayed to the user by way of a clearly visible LED or an alternative display unit, or on the LCD display on microscope 9.

A further embodiment for generating a nanocell can be based on the use of Bluetooth. This technology traditionally extends over only a few meters and therefore can be used only at short distances. A prerequisite for using this technology, however, is achievement of a sufficiently high data rate that the user still perceives microscope operation to be in real time.

As depicted in FIG. 2, the fields, in particular those of first range 1' of all three microscopes 9, are shaped so that the fields of the different microscopes 9 do not interfere with one another, so that an input/output device 3 can be unequivocally linked to one and only one microscope 9.

A further embodiment for generating a nanocell can be based on the use of an active access point. This technology enables direct linkage of a mobile user device to the microscope, with the advantage of a high data transfer rate.

FIG. 3 shows possible control and application examples in the form of a tree structure. In the interest of clarity, this tree structure is split into two parts to the right and left of a node 300 "Mic Wi-Fi for iPad"; the left side is illustrated in FIG. 3a, while the right side is divided into four sub-branches that are depicted successively in FIGS. 3b, 3c, 3d, and 3e.

Figure 3A:
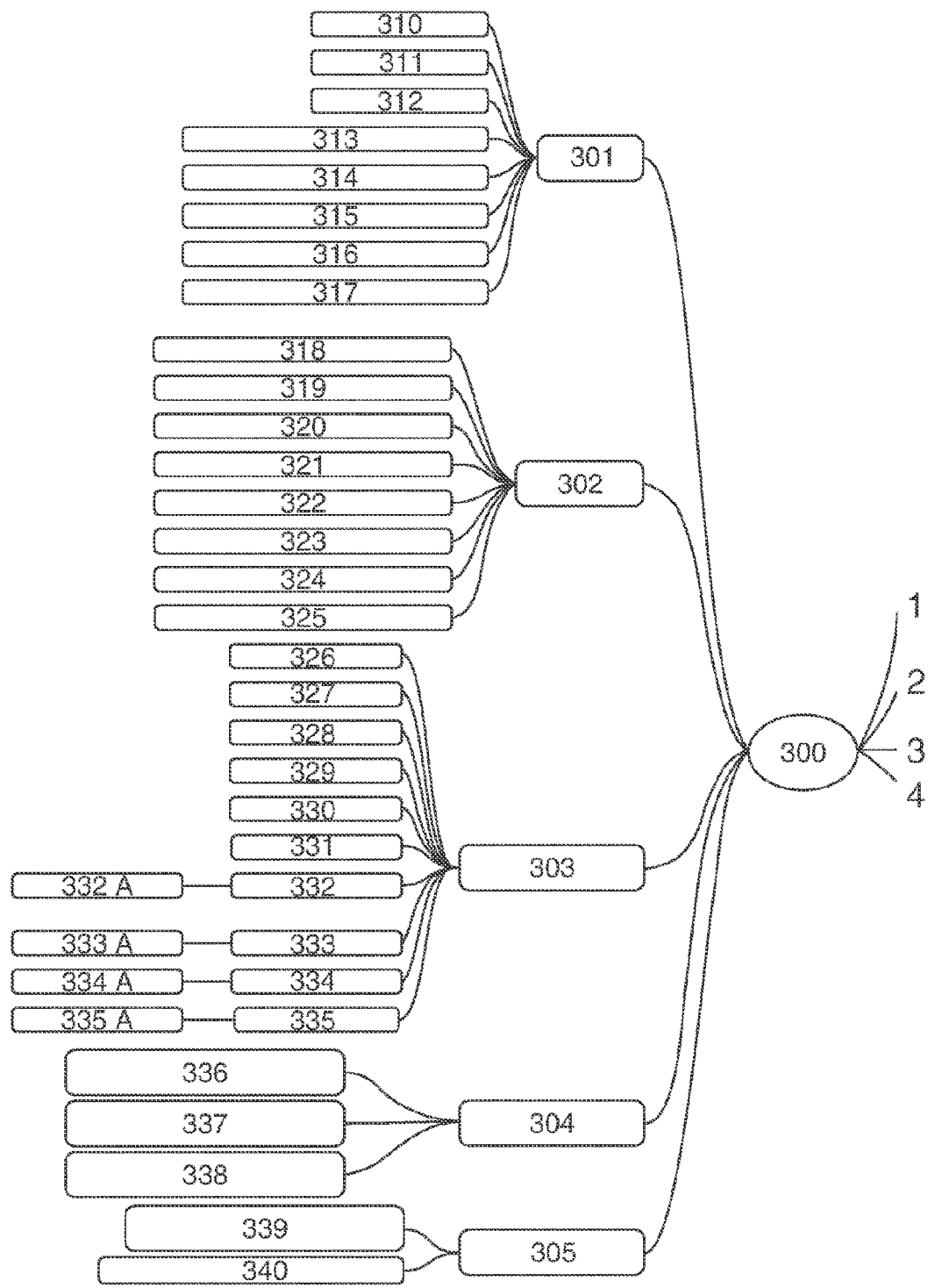
FIG. 3 shows possible control and application examples in the form of a tree structure.
Figure 3B:
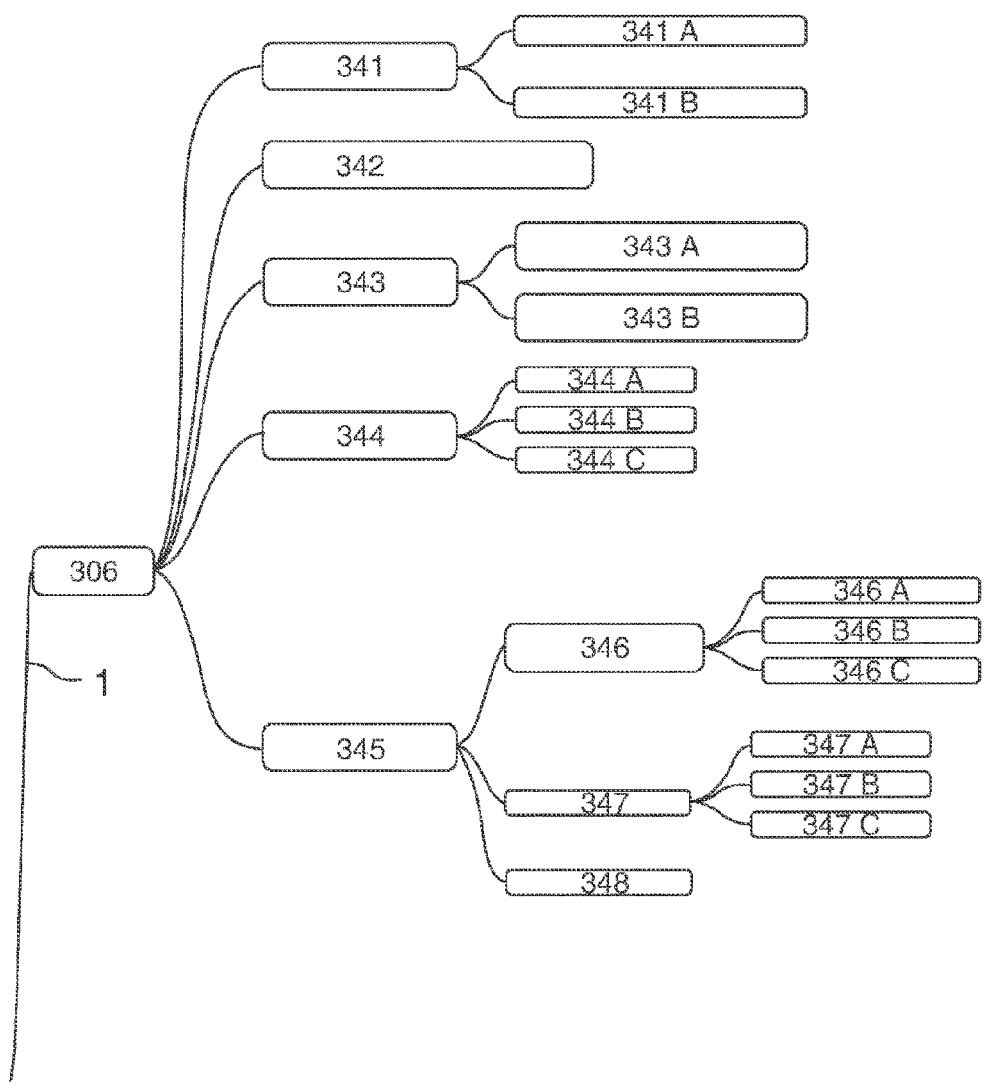
Figure 3C:
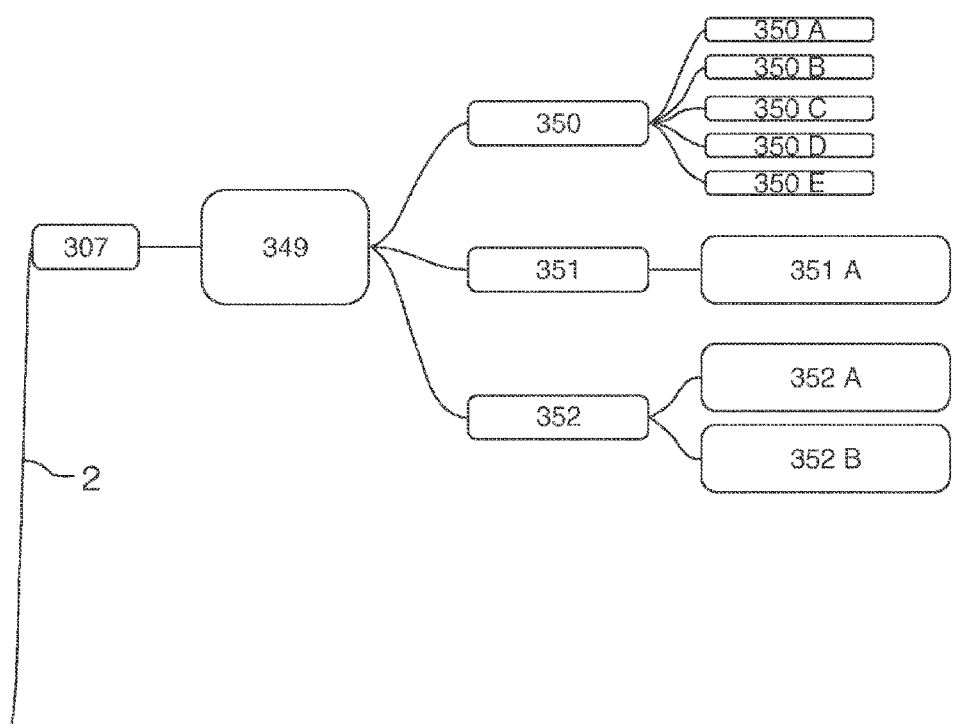
Figure 3D:
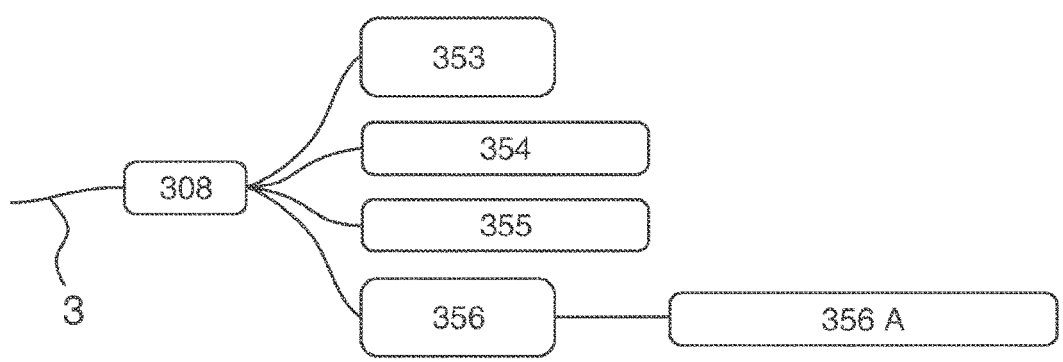
Figure 3E:
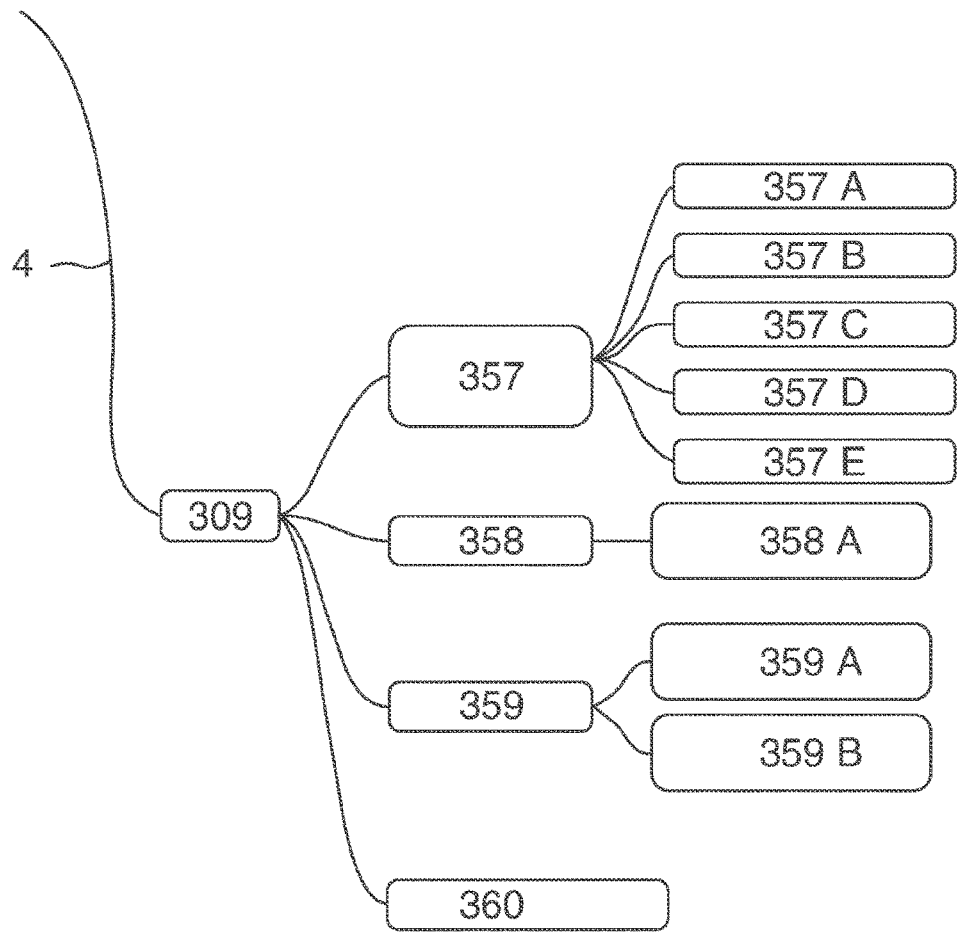

Features of the tree structure according to FIG. 3b
The features include the following sectors:
Wireless interface 306 for
    Multiple devices 341
        e.g. X, Y, Z adjustment, microscope control, 341A
        e.g. lamp control 341B
    Software development package 342 for writing apps for input control devices, e.g. iPad
    Data acquisition 343
        Acquired data are written directly into the control unit, e.g. iPad, 343A
        Data are written directly into an external device provided, e.g. NAS or other memory, 343B
    Uniform data format
        e.g. XML file for data exchange, 344A
        e.g. OME.TIF for image data, 344B
        export interface for database, 344C
    Multiple users simultaneously, 345
        One of the connected users is master, 346
            Master has complete microscope control, 346A
            Master can allow other users to participate, 346B
            Other users have restricted access, 346C
        Multiple users, 347
            Restricted access rights 347A
            Control by master 347B
            Can, for example, receive images, 347C
        Useful for presentations, training sessions, etc., 348.
Features of the tree structure according to FIG. 3c
Automatic method setting 307
    Each user can use his own microscope data profile; that profile is stored on a control device, e.g. the iPad, or in an external database, 349
        The microscope can be automatically set as it was set the last time by the user, or as required by the particular experiment, 350
            e.g. light sources, 350A
            e.g. filters, AOTF, AOBS, etc., 350B
            e.g. stage position 350C
            e.g. Z position 350D
            etcetera . . . , 350E
    Switch the microscope to different data profiles, 351
        Each user can generate, process, and store different microscope user profiles; the microscope can change its settings with a mouse click, 351A
    Automatic method switchover, 352
        As soon as a new user links in with his wireless device, the microscope can receive the settings and set itself, 352A
        When a user leaves the microscope the connection is released; the most recent microscope setting is stored; optionally the microscope can return to a baseline state that does not allow a subsequent user to draw conclusions as to his predecessor's settings, 352B
Features of the tree structure according to FIG. 3d
Security 308
    The data protocol for controlling the microscope can be password-protected, 353
    Data flow between the wirelessly connected devices can be encrypted, 354
    Image data sensed under wireless control can be encrypted, 355
    User rights (rights regarding control and utilization of the microscope) can be defined by a facility manager, 356
        Depending on the user rights, microscope use may not be permitted for a selected user, 356A
Features of the tree structure according to FIG. 3e
Logging 309
    The session of a user connected to the microscope or to the external device can be logged, 357
        time (duration) 357A
        name 357B
        beginning and end of session, 357C
        equipment used (e.g. which laser was used, etc.), 357D
        etc., 357E
    Microscope rental ("rent-a-microscope"), 358
        the microscope provider can determine costs based on an analysis of the log file, 358A
    The log file can be saved, 359
        on the provider PC, 359A
        on the connected control device, 359B
    can be saved in a database, 360
Features of the tree structure according to FIG. 3a (from bottom to top)
Voice control and documentation, 305
    Microscope is controlled by voice control using the connected wireless device, 339
    Spoken words are documented, 340
Touch-sensitive device in combination with hardware, 304
    Press a button/key and touch an area on the input device, 336
    Press multiple buttons/keys and tap on a touch-sensitive area of the input device, 337
    Rotate a device/device element (e.g. Z displacement of microscope) and touch an area of the input device, 338
Gesture control for touch-sensitive devices, 303
    Based on one finger, 326
    Based on two fingers, 327
    Based on three fingers, 328
    Based on four fingers, 329
    Based on five fingers, 330
    Based on fingers on one hand, 331

Based on fingers on both hands, 332
two wirelessly linked input devices are required, 332A
Tap/multiple tap on the display, 333
e.g. simulating a mouse click, 333A
Swipe on the display, 334
e.g. in order to move the microscope stage within the image field, 334A
Finger movement over the display, 335
e.g. to move the microscope stage, 335A
Combination of gestures and contact with any machine unit, e.g. Z drive knob
Gestures that are individually adapted to a user and his motor capabilities in order to provide him, especially in the case of a disability, with alternative gestures that he can perform
Control interface, 302
WLAN, IEEE standards, e.g. 802.11.i, etc., 318
Bluetooth, 319
USB interface to adapter, 320
WECA-compatible devices, 321
Devices supporting GSM standard, 322
Devices supporting GPRS standard, 323
Access point, 324
Leica-internal control interfaces, 325
additional wireless control interfaces or adapters, etc.
Control devices, 301
iPad, 310
iPhone, 311
Android, 312
Tablet PC, 313
Leica devices, e.g. SmartMove, etc., 314
Touch panels, 315
Bluetooth keyboard, 316
Additional wireless devices, 317

Figure 4:
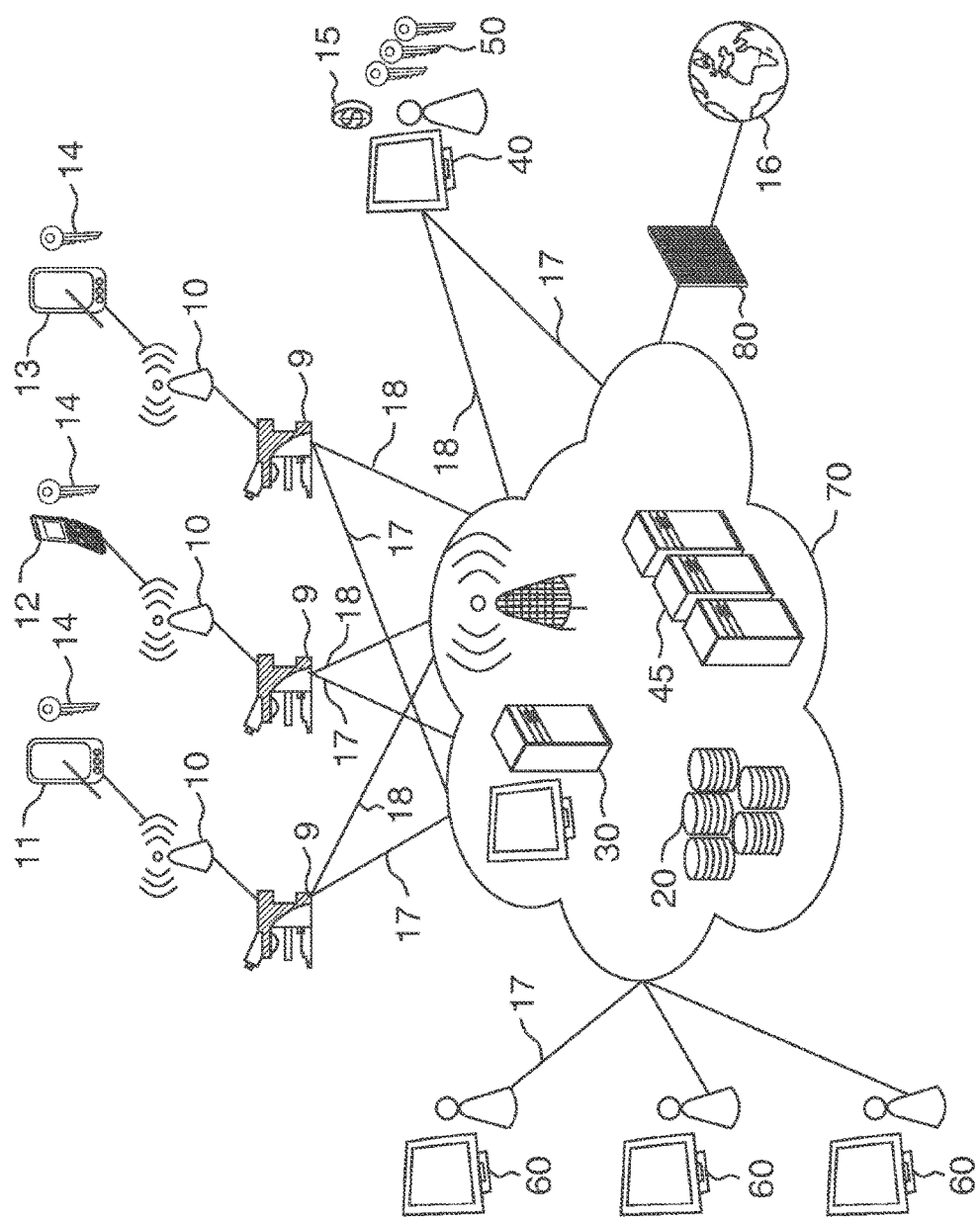
FIG. 4 schematically shows a configuration for intercommunication having three microscopes in a microscope system.

FIG. 4 schematically shows a configuration for intercommunication with three microscopes in a microscope system (facility).

To control his microscope 9, the user utilizes a mobile user device, for example an iPad 11 as depicted, a mobile system 12, or a BlackBerry 13, in which context the user logs into a microscope 9 with his mobile user device via the radio network having a first (short) range 10. A facility manager 40 issues user keys 50 that the user redeems at the microscope assigned to him by logging in. The respective key (user key) assigned to him is labeled 14. With such a system, for example, a cost invoice for user time can be prepared by facility manager 40. Microscopes 9 can be connected to microscope facility infrastructure 70 both via their radio network 18 having a second (longer) range and via normal cable LAN 17. Microscope facility infrastructure 70 encompasses the following components: application server 30, facility infrastructure 45 (i.e. the computing capacity for furnishing the microscope system infrastructure), and data memory 20.

The data generated can travel to data memory 20 both by radio (radio network 18) and by cable LAN 17. The data can be analyzed within the microscope system at data analysis stations 60. Alternatively or additionally, the data are fed into the global Web 16 (with interposed firewall 80) to be processed and analyzed outside the microscope system.

Figure 5:
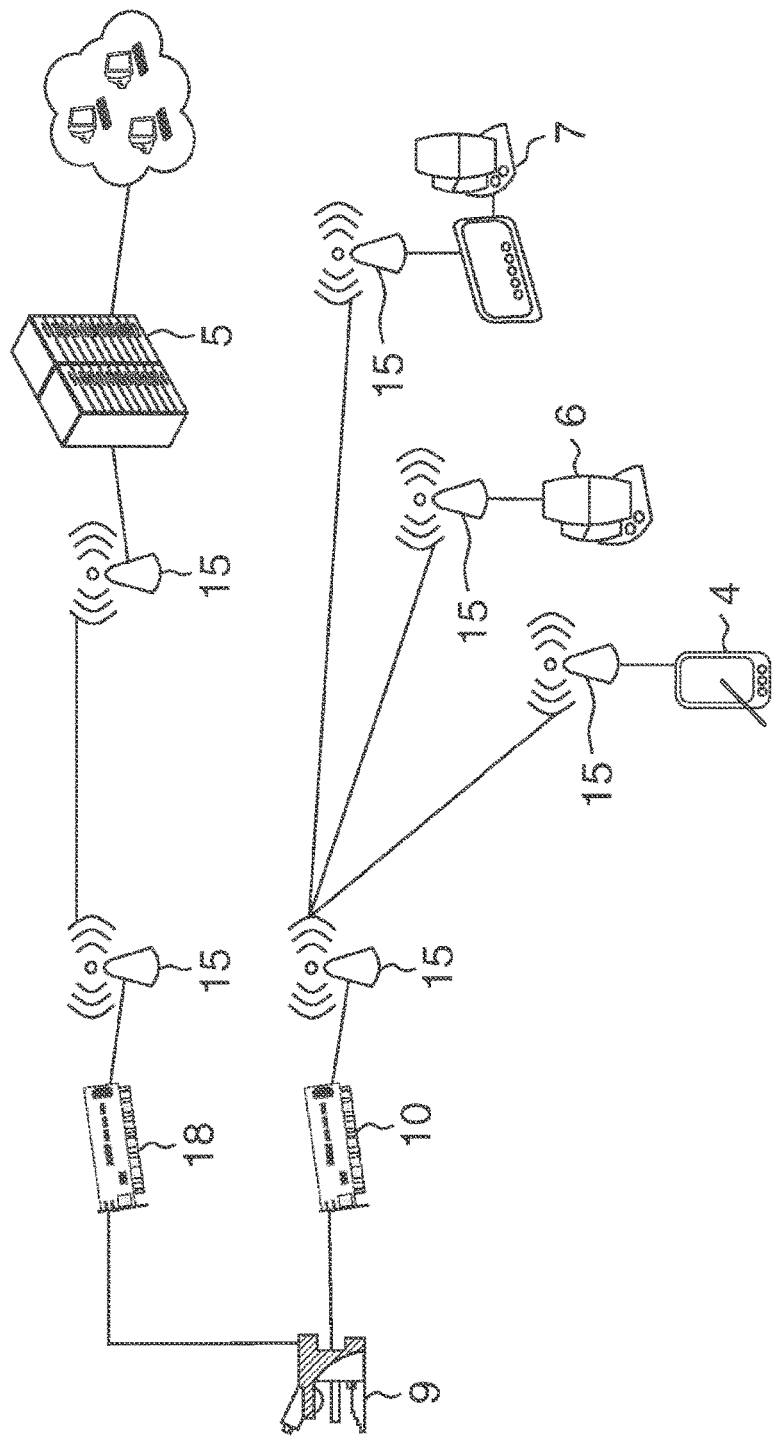
FIG. 5 schematically shows microscope communication using an external WLAN and a microscope-internal WLAN.

FIG. 5 schematically shows microscope communication using an external and a microscope-internal WLAN. For this, a microscope 9 has at least two wireless LAN (WLAN) subassemblies 10 and 18 added to it; at least one subassembly, in this case 10, makes available a microscope-internal WLAN service, while at least one further subassembly, in this case 18, can be connected to an existing external WLAN network 5.

Subassembly 10 that makes available the microscope's own WLAN service is available for the connection of external wireless devices 4, 6, or 7. The microscope's own WLAN service ensures a maximum, interference-free communication speed. Radio systems 10 and 18 possess antennas 15 for wireless communication with connectable WLAN devices 4, 6, 7 and with the external WLAN networks, the latter components in turn possessing antennas 15.

WLAN devices connectable to the microscope's own WLAN service can be, for example, the following subassemblies:
external device 4, such as an iPad, iPhone, tablet PC, laptop, smartphone, dedicated touch panel, etc.
Leica SmartMove 6 for modifying the X, Y, Z position of the object, and those Leica SmartMoves 7 having a display
robots for injecting a drug into the prepared sample
robots for changing a sample.

The external WLAN subassemblies both from the manufacturer of the microscope and from third-party providers can be connected wirelessly, since the WLAN protocol that is used ensures 100% compatibility with the standard.

Input/output elements having a touch panel (e.g. an iPad) benefit in particular from the fast and direct microscope-integrated WLAN service connection. Thanks to the more direct communication with the microscope actuators, entirely novel control approaches can be integrated into the microscope, for example gesture control (every touchpad input is understood hereinafter as a gesture).

Figure 6:
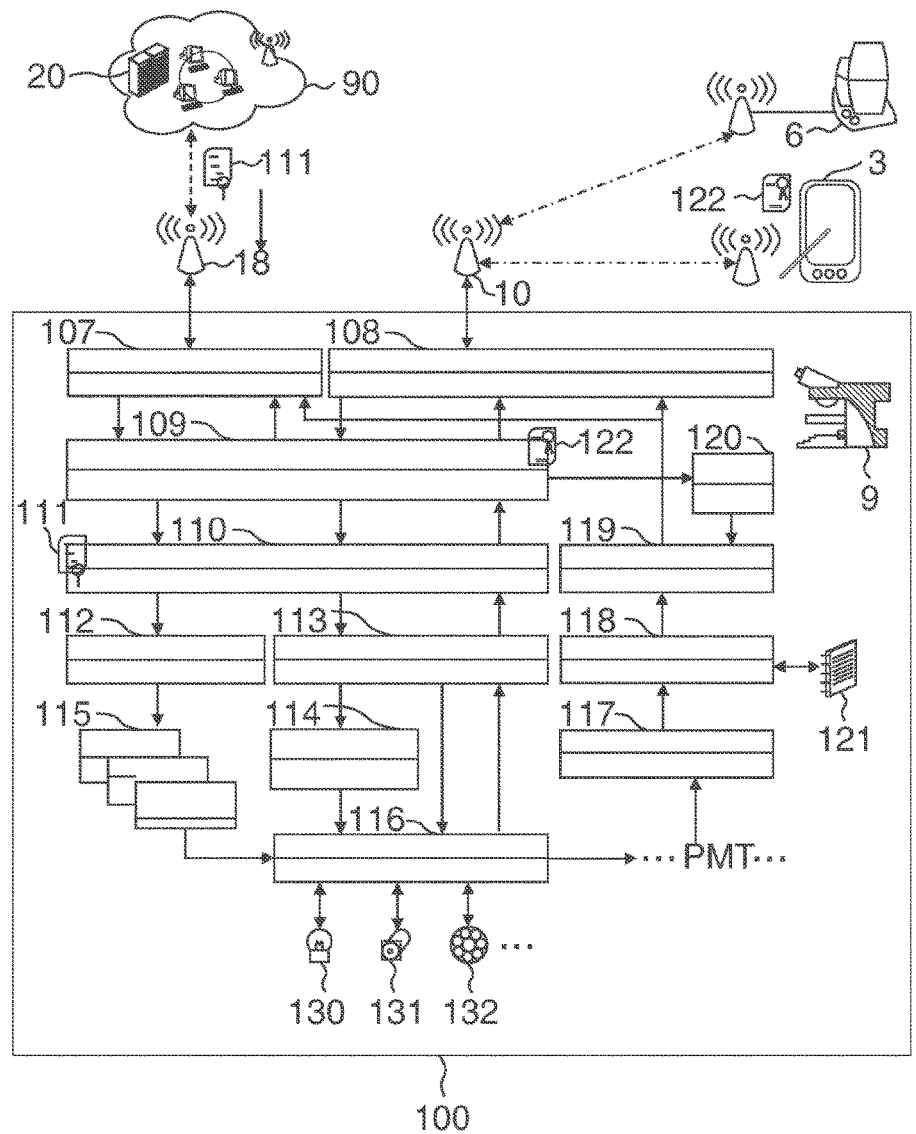
FIG. 6 shows communication with a possible central data manager, on the basis of a configuration according to FIG. 5.

FIG. 6, based on a configuration in accordance with FIG. 5, shows communication with a possible central data manager. As in FIG. 5, microscope 9 possesses a microscope-internal WLAN 10 and a radio network 18 for connection to a normal ("usual") WLAN. A mobile user device (iPad) 3 and a Leica SmartMove 6 are depicted by way of example as external devices. External WLAN network 18 is in radio communication with a facility, laboratory, etc., i.e. with a microscope system 90 that comprises one or more microscopes 9 of the kind discussed above. Both radio systems 10 and 18 are equipped for communication with a central data manager 100 via WLAN managers 107 and 108. The modes of operation of the components of central data manager 100 will be explained in further detail below.

WLAN manager 108 for external devices implements connection and communication based on a standard protocol (e.g. IEEE 802.11 to IEEE 802.11n or newer). Even today, this already ensures a data transfer rate of up to 600 MB/s (IEEE 802.11n). External input/output devices, for example an iPad 3, support this standard and permit communication with microscope 9. The WLAN manager can in particular manage the access point, in particular its settings, such as issuance of a unique access point name assigned to the microscope.

The received data then pass through a service manager 109. This manager 109 provides the most essential basic checks (e.g. a login process). It also checks, by way of a content service, the availability of internal and external resources (e.g. whether the microscope is ready to operate or an external data memory is available). A version service enables replacement of the firmware versions available on the microscope with the versions that are expected by the external input/output devices and their programs. A workflow service checks whether the application that is to be executed on the microscope is in fact possible (e.g. whether the hardware necessary for the experiment (e.g. a specific laser wavelength) is in fact available). The quality assurance (QA) service ensures that variables necessary for quality are in place (e.g. if the operating duration of a component is critically important for the quality of a measurement: is the lamp too old? will it soon burn out?).

Service manager 109 also deals with the loading and provision of application modules 115. These are apps 115 that can be loaded into the microscope and can reside there temporarily or permanently in a memory. These apps then control the entire application sequences by directly accessing device manager 116 and directly controlling the hardware. These apps 115 can therefore be loaded into the microscope, and thus enhance its capabilities ("smart microscope"). Directly controllable microscope components in this context are, for example, lamp 130, motor 131 (e.g. for the microscope stage or focusing drive), and filter wheel 132.

Service manager 109 can moreover load specific data output plugins. These plugins generate a specific data output format in the export format/CAM 120. Various plugins can generate different data output formats (e.g. OME.TIF images) (OME=Open Microscopy Environment) or JPG2000-compressed images. Because it is hardware-embedded, a plugin module of this kind with hardware support can execute very rapidly. A further embodiment is that the plugin also transmits Computer Aided Microscopy (CAM) data into the network. A further embodiment is that the plugin makes a standardized web service available.

Service manager 109 furthermore handles method switchover 122 at the microscope, i.e. it receives from the user's iPad 3 an information item that contains the requisite settings data (objective, stage position, laser intensity, etc.) for the microscope. As soon as the user has checked in at the microscope, method switchover is executed via a control file and the microscope is automatically set to his requirements.

Security manager 110 ensures the necessary authorizations on the microscope and its subassemblies. The data flow (wireless communication with external subassemblies) can furthermore be encrypted. The respective settings (permissions) are described by a policy document 111. The policy can be defined by the facility manager and loaded via WLAN 10 (or 18) and via facility network 90 onto the microscope. This feature allows the operating time and utilization of the microscope to be monitored by the facility manager and ultimately billed ("rent-a-microscope").

Execution then proceeds via application manager 112 or input/output manager 113, depending on the application. If the user wishes only to start a specific, automatically executing application on the microscope, application manager 112 is addressed. The latter then loads one of the desired application modules (apps) 115 and executes it directly.

In the other case, i.e. when the user wishes to make certain settings on the microscope by means of the external input/output device (e.g. iPad 3), the inputs proceed via input/output manager 113 to gesture manager 114.

Gesture manager 114 is a gesture interpreter. It can therefore convert the various gestures performed by the user on the touchpad of his input system (e.g. iPad 3) directly into hardware commands. For example, spreading two fingers apart can result not in a software magnification on the iPad, as is usual, but instead can be converted directly into a hardware modification, i.e. for example actually zooming in or changing an objective. Swiping with two fingers could therefore directly initiate a stage motion that moves the image segment one complete image width or image height in the X or Y direction. A circular motion on the touchpad would be converted into a hardware rotation of the image (e.g. by direct application of control to the double prism in the SP5 for beam rotation).

Gesture control systems on a PC (swiping with a mouse) and on touch panels (swiping with a finger) are already known. Here, however, the gesture is implemented directly in the hardware.

Gesture manager 114 accesses device manager 116 directly, and can thereby apply control directly to the hardware.

If direct inputs are, on the other hand, to be made via input devices such as a Leica SmartMove 6 or the like, input/output manager 113 can bypass gesture manager 114 and address device manager 116 directly.

All microscope components or subassemblies to which device manager 116 applies control (e.g. laser, lamp, stage, Z position, filter, filter wheel, etc.) immediately and continuously return status feedback to the external devices that are linked via WLAN. It is only this fast feedback that produces a control loop so that the processes in a microscope can reasonably be controlled via an external device.

One exception is the subassembly of the imaging elements (e.g. a camera). These elements feed back their data via a fast stream through exporter 119 (streaming server). The data stream passes through one or more filters that appropriately model the image before it is streamed onto the output device. In particular, a point spread function (PSF), with which the image data can be deconvoluted in almost real time in manipulator 118 ("programmable filter core" for denoising, deconvolution, and filtering) can be stored in a register 121.

The image data output service of exporter 119 can furthermore be influenced by a loadable plugin, in such a way that the image data output service generates a desired output format (e.g. OME.TIF images), or feeds the image data into a database (laboratory image management system, LIMS). The plugin furthermore defines whether further data (e.g. CAM commands) are outputted.

Image manager 117 selects the image from the devices available (confocal microscope, microscope camera, photomultiplier (PMT)) and delivers it to manipulator 118 for image processing (e.g. denoising, filtering, etc.). External devices such as a PMT can also be additionally controlled by device manager 116.

The image data output service outputs its data stream not only via WLAN-2 10 to the connected devices (live stream of images onto iPad 3) but also, concurrently therewith, via WLAN-1 18 to the WLAN of facility 90. The data can thus also be streamed onto an external data memory 20.

The facility manager can define the exact location for data storage by transferring the data for that purpose via WLAN-1 18 to service manager 109 of the participating microscope.

Facility manager 40 (see FIG. 4) can thus assign to the user one or more microscopes 9 with which he can work. At the same time, the facility manager allocates a specific memory space to the microscopes for image data. Once the user has wirelessly logged into microscope 9 assigned to him, he can immediately begin the experiment.

Figure 7:
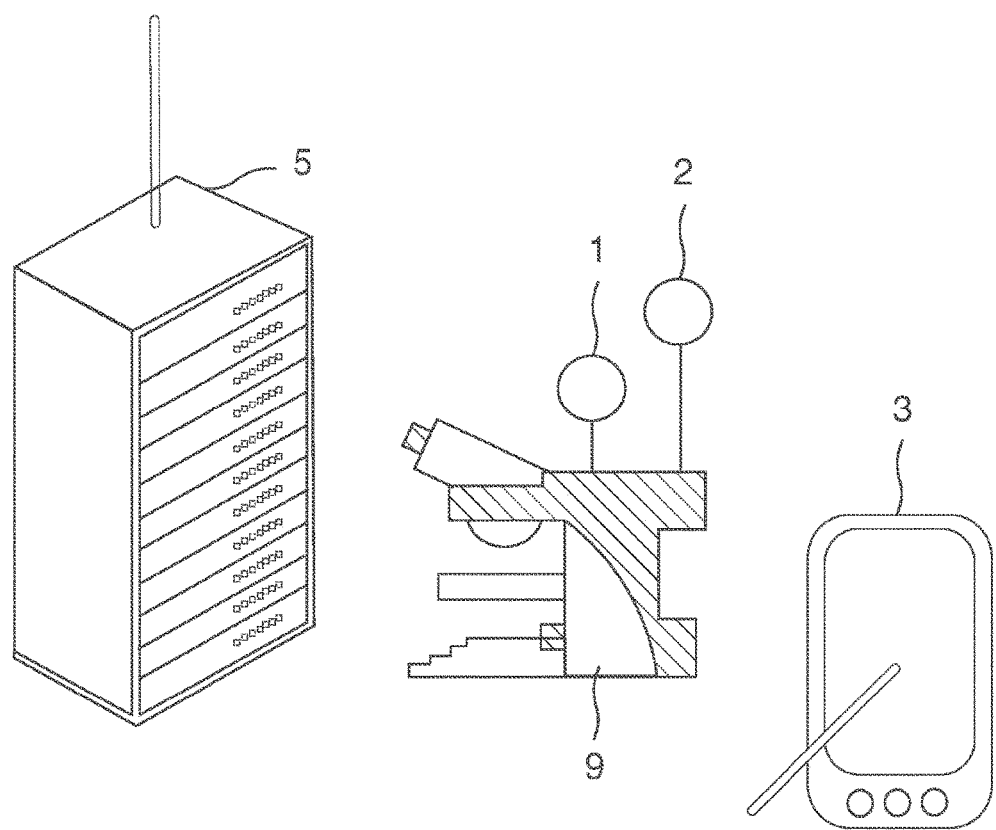
FIG. 7 shows a microscope system according to the present invention.

FIG. 7 is a schematic view of a microscope system having a microscope 9 having a first radio system 1 and a second radio system 2, a mobile user device 3, and an external WLAN network 5. Reference may be made to the explanations of FIG. 5 regarding the operation and embodiments of this system. Once again, radio system 1, in particular having a short/limited range, is embodied as an "autonomous" radio system for communication with an input/output device 3, in this case an iPad; while second radio system 2, in particular a longer-range radio system, is embodied for communication with another radio system of an external WLAN network 5, for example of a facility or data center, in particular infrastructure 70 in accordance with FIG. 4.

In a constellation similar to the one of FIG. 7 but having two mobile user devices, in this case two iPads, for controlling the microscope, where the right and the left iPad control different regions of the microscope, the user can be given the capability of controlling the microscope with both hands. For example, he can zoom with the right hand and move the stage with the left hand.

Summary of Advantageous Features

- Unequivocally display the linkage status of a microscope by means of an LED or an alternative display element, e.g. a liquid crystal display.
- Equip a microscope with at least two WLAN interfaces, at least one of which is not connected to an external WLAN network but instead handles communication with microscope control elements. This can be, in particular, an access point integrated into the microscope.
- Define the activities permitted on a microscope by way of a policy that is transferred via a network to the microscope.
- Define the degree of data encryption by way of a policy that can be transferred via network to the microscope.
- Automatically switch over microscope methods by transferring a corresponding control file (122) to the microscope.
- Monitor the microscope elements and operating by way of an external controller (e.g. facility manager) via WLAN
- Link all common WLAN input devices wirelessly to a microscope, in particular iPad, iPhone, mobile phone, touch devices, tablet PC, laptop.
- Fast feedback of actuator states via WLAN to control devices.
- Define the location to which image data are streamed via WLAN by an external controller (e.g. facility manager).
- Specialized apps uploaded directly into the microscope via WLAN by an external controller (e.g. facility manager, or by the user).
- Special PSFs uploaded directly into the microscope by an external controller (e.g. facility manager, or by the user) via WLAN for online deconvolution purposes.
- Special data output plugins uploaded directly into the microscope by an external controller (e.g. facility manager, or by the user) via WLAN for controlled data output purposes (e.g. OME.TIF).
- Interpret gestures and touch inputs on, for example, an iPad, with direct conversion into corresponding hardware reactions by a gesture manager.
- Data exchange regarding utilization and utilization duration of specific microscope elements for billing purposes ("rent-a-microscope") or for quality assurance actions (maintenance interval).
- Control a microscope's hardware directly via gestures using one, two, three, four, or five fingers, which are placed simultaneously onto a touchpad and perform specific motions.
- Move the stage by moving a finger in X and Y directions on a touchpad, with direct hardware implementation.
- Move the stage in larger increments (corresponding to one image size) by swiping motions with, for example, one or two fingers in a specific direction on the touchpad (e.g. iPad).
- Switch objectives by spreading two fingers on the touchpad, which is intended to generate zooming into or out of the specimen.
- In confocal microscopes, zoom in or out by influencing scanning beam deflection by spreading two fingers on the touchpad (e.g. iPad).
- Rotate the beam axis with a rotating motion of two fingers on the touchpad (e.g. iPad), for example in SP5 context by rotating the double prism.
- Control brightness by moving a finger up and down on the touchpad (e.g. iPad).
- Modify Z position by moving a finger up and down on the touchpad (e.g. iPad).
- Initiate switchover processes on the microscope by double-tapping with one or two or three fingers on the touchpad (e.g. iPad).
- Stream image data generated by a microscope directly to a wirelessly linked user device (e.g. iPad).
- Concurrently stream image data generated by a microscope directly into external storage.
- User login into a microscope limited to components, following prior authorization of permitted component (e.g. white light laser cannot be used, but all other lasers can).
- Store most recent status (settings) of a microscope on the control device (e.g. iPad) or at the facility manager, in order to recreate the microscope status at the next login.

Advantageous embodiments (more details) are characterized in that:

at least two WLAN networks are built into a microscope in such a way that at least one of the WLAN networks functions as a WLAN service and operates as an autonomous WLAN network that at least one input/output device, preferably an iPad, iPhone, tablet PC, laptop, can log into directly without being assigned to another network, and in such a way that the microscope contains at least one further WLAN connection that allows communication using a "normal," external WLAN network, if the latter is offered in its vicinity;

a specially adapted (e.g. via firmware) gesture manager permits direct conversion of gestures into hardware reactions (touch, finger swiping on touch display, use of multiple fingers, double-tapping on display);

the gesture manager links a finger touch motion on the display in an X, Y direction directly to the microscope stage hardware, thereby enabling a motion of the microscope stage in an X, Y direction;

the gesture manager links a finger touch motion on the display in an X or Y direction directly to the microscope Z drive hardware (e.g. Z galvanometer), thereby enabling a change in the Z position of the microscope;

the gesture manager links a finger touch motion on the display in an X or Y direction directly to the microscope illumination hardware (e.g. laser), thereby enabling a change in the light intensity of the microscope;

by means of the gesture manager, a two-finger touch motion on the display in an X, Y direction, in which the two fingers are placed onto the touch display and then spread apart or pinched together, is fed back directly to the microscope hardware in such a way that a hardware-based zoom is carried out;

by means of the gesture manager, a two-finger touch motion on the display in an X, Y direction, in which the two fingers are placed onto the touch display and then rotated in a circle (like a pair of compasses), is fed back directly to the microscope hardware in such a way that a hardware-based rotation of the image plane is carried out;

the gesture manager transfers a one-, two-, or multiple-finger tapping motion (single tap, double tap, multiple tap within a specific time interval) into corresponding hardware reactions, e.g. switching a shutter on and off;

the gesture manager can easily be reprogrammed so that it converts specific touchscreen motions into specific hardware changes (e.g. in order to adapt gestures to right- or left-handedness, e.g. in order to allow a person with restricted haptics (disability) to operate the microscope using gestures of which he is capable; e.g. in order to allow other hardware (e.g. filter wheel) to be controlled via gestures);

the input/output data of at least one WLAN network integrated into the microscope are processed by a software-based (e.g. firmware) service manager in such a way that password-controlled access authorization (login) for the input/output devices, preferably iPad, iPhone, tablet PC, laptop, can occur;

the login process is optionally or automatically followed by a method switchover of the microscope in which all the microscope settings necessary for the experiment are automatically established;

the login process is optionally or automatically followed by a method switchover of the microscope in which all the microscope settings reset themselves to the settings most recently used by the relevant user;

the login process is optionally or automatically followed by a method switchover of the microscope in which all the microscope settings reset themselves to settings which are stored in a file that the user (via his input/output device, preferably an iPad, iPhone, tablet PC, laptop) or the facility manager (via WLAN) manually or automatically transfers to the service manager;

the output format of the image data can be adapted by way of a loadable plugin in such a way that the image data that the microscope streams onto an external element can be adapted to requirements, e.g. by outputting an OME.TIF image;

the output format of the image data can be adapted by way of a loadable plugin in such a way that the image data that the microscope streams onto an external element also contain the metadata of the image acquisition process (e.g. time of day of image acquisition, current laser intensity, number of channels);

the output format of the image data can be adapted by way of a loadable plugin in such a way that once an image is successfully saved, a CAM command is outputted in which the client in the network is informed as to where the image has just been saved;

the input/output data of at least one of the WLAN networks integrated into the microscope are processed by a software-based (e.g. firmware) service manager in such a way that a content check can occur in which the availability of internal and external resources can be ascertained;

the input/output data of at least one of the WLAN networks integrated into the microscope can be processed by a software-based (e.g. firmware) service manager in such a way that a version check can occur for synchronization with the requirements that a specific application wishes to implement using the microscope;

the input/output data of at least one of the WLAN networks integrated into the microscope are processed by a software-based (e.g. firmware) service manager in such a way that a quality assurance can occur, so that e.g. the operating duration and operating frequency of relevant microscope subassemblies (e.g. lasers) can be reported via WLAN to a central location (e.g. enterprise);

the microscope contains a security manager that defines the access rights to the microscope and to individual components of the microscope, e.g. for the purpose of access, authorized by a facility manager, to a microscope for a specific user, with the objective of measuring the utilization duration of the microscope and/or of individual components of the microscope so that the user can be charged a fee for using the microscope and/or specific parts of a microscope ("rent-a-microscope");

the microscope contains a security manager that encrypts the data which are exchanged between the WLAN systems appropriately so as to make it difficult for third parties to eavesdrop on the data;

the microscope contains a security manager that contains a policy document which can be exchanged with the facility manager via the WLAN in such a way that said policy document contains the rights regarding operation of the microscope and/or of individual parts of the microscope, as well as data encryption;

complete hardware applications in the form of one or more hardware apps can be loaded onto the microscope in such a way that said applications can be centrally started, executed, and monitored by the facility manager;

complete hardware applications in the form of one or more hardware apps can be loaded onto the microscope in such a way that said applications can be centrally started, executed, and monitored by the user from his input/output devices, preferably iPad, iPhone, tablet PC, laptop;

any change in hardware status can very quickly be reported back via a device manager to the peripheral connected via WLAN;

other subassemblies (e.g. filters, motors, lamp) for which data are not inputted via gestures (e.g. a SmartMove, a robot for introducing liquid or for replacing a sample) can also be directly controlled via a device manager in such a way that the gesture manager is bypassed;

data from an imaging system (e.g. camera) are transferred via a special very fast streaming service to the elements connected via WLAN (e.g. display of the iPad; data storage);

data from an imaging system (e.g. camera) pass, before transfer (data streaming), through at least one hardware filter in which the image can be specifically modified;

data from an imaging system (e.g. camera) pass, before transfer (data streaming), through at least one hardware filter that can access, via a memory, a point spread function (PSF) loadable via WLAN, in such a way that it can carry out a "real time" deconvolution;

data from an imaging system (e.g. camera) pass, before transfer (data streaming), through at least one hardware filter controlled and selected by the user, for example in order to perform denoising of the image.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Radio system having a first radio characteristic
1' First range
2 Radio system having a second radio characteristic
2' Second range
3 Mobile user device, iPad
4 External device
5 External WLAN network
6 External device
7 External device
9 Microscope
10 Radio network having a first range, subassembly for microscope-internal WLAN
11 Mobile user device
12 Mobile user device
13 Mobile user device
14 User key
15 Antenna
16 Global Web
17 Cable LAN
18 Radio network having a second range, subassembly for WLAN external to the microscope
20 Data memory
30 Application server
40 Facility manager
45 Facility infrastructure
50 User key
60 Data analysis station
70 Microscope facility infrastructure
80 Firewall
90 Microscope system, facility network
100 Central data manager
107 WLAN-1 manager
108 WLAN-2 manager
109 Service manager
110 Security manager
111 Policy document
112 App manager
113 Input/output manager
114 Gesture manager
115 App, application module
116 Device manager
117 Image manager
118 Manipulator
119 Exporter
120 Export format/CAM
121 Register
122 Method switchover control file
130 Lamp
131 Motor
132 Filter wheel
300-360 Possible control and utilization steps

The invention claimed is:

1. A microscope, comprising:
a microscope control unit including at least one radio system having a wireless radio interface, wherein the at least one radio system of the microscope control unit comprises at least one of:
at least one first radio system having a short range and at least one second radio system having a long range; or
at least one radio system configured to furnish the short range and the long range in a predetermined time cycle by varying a field energy of the at least one radio system,
wherein the microscope is configured to detect a mobile user device that is located in both the short range and the long range based on the at least one radio system switching from the short range to the long range or switching from the long range to the short range, and
wherein the microscope is configured such that a mobile user device that is located in the long range and outside of the short range is not detected upon the at least one radio system switching to the short range, but is detected based on the at least one radio system switching to the long range so as to determine unequivocally whether the mobile user device is located in the short range or the long range.

2. The microscope according to claim 1, wherein at least one of the ranges is adjustable.

3. The microscope according to claim 1, wherein the at least one first radio system constitutes an access point that enables direct linkage of the mobile user device to the microscope.

4. The microscope according to claim 1, wherein the short range of the at least one first radio system is adapted to support Near-Field Communication (NFC) or Bluetooth as a transfer standard.

5. The microscope according to claim 1, wherein the short range of the at least one first radio system is characterized by a first Internet Protocol (IP) address and a first port address, and the long range of the at least one second radio system is characterized by another, second IP address and another, second port address.

6. The microscope according to claim 1, wherein the short range is characterized by a first shape of a radio field, and the long range is characterized by a second shape of a radio field.

7. The microscope according to claim 1, wherein the short range of the at least one first radio system is configured for communication with at least one input device, at least one output device or with the mobile user device.

8. The microscope according to claim 1, wherein the long range of the at least one second radio system is configured for communication with at least one central data manager.

9. The microscope according to claim 8, wherein the at least one second radio system or the long range of the at least one radio system is configured to communicate with the network external to the microscope.

10. The microscope according to claim 1, wherein the microscope control unit comprises a further radio system or a network connection for communication with a network external to the microscope.

11. The microscope according to claim 1, further comprising actuators configured to control microscope components, wherein at least one of the actuators has a parallel control port configured to provide for control of the at least one of the actuators by way of an input device or the mobile user device.

12. The microscope according to claim 11, wherein the parallel control port possesses a very fast data transfer protocol.

13. The microscope according to claim 1, wherein the microscope has, for communication with the mobile user device that permits the input of gestures by means of a touchscreen, an input/output manager that encompasses a gesture manager.

14. The microscope according to claim 13, wherein the gesture manager is configured to convert user inputs by way of gestures on the mobile user device into control instructions for the microscope.

15. The microscope according to claim 14, wherein the gesture manager is configured to interpret at least one of the following gestures as the following corresponding control instructions to the microscope:
- a motion of an input means, a finger or stylus, on a touchscreen of the user device in an (X, Y) direction, as a control instruction for direct motion of a microscope stage in the (X, Y) direction;
- a same motion in another input mode, as a control instruction for modifying the Z position of the focusing drive of the microscope;
- a same motion in yet another input mode, or a tap with the input means, as a control instruction for a change in the illumination intensity of the microscope illumination unit;
- a relative motion of at least two input means away from or toward one another on the touchscreen, as a control instruction for a change in magnification by means of a magnification changer or a zoom system of the microscope;
- a rotation of at least two input means on the touchscreen, while maintaining their relative spacing, as a control instruction for a rotation of the image plane; and
- tapping once or repeatedly with the input means, in specific input modes, as a control instruction for switching on or off a microscope actuator associated with the input mode, such as a shutter, filter, or microscope illuminator.

16. The microscope according to claim 13, wherein the gesture manager is configured to learn and detect new gestures so as to enable a disabled person, who is not capable of performing a specific gesture, to use an alternative gesture.

17. The microscope according to claim 1, the microscope control unit being embodied in such a way that as a result of linkage of the microscope to the mobile user device via the wireless radio interface, microscope adjustments for a predetermined microscope investigation are performed via the microscope control unit as a function of the mobile user device or as a function of an input detection.

18. The microscope according to claim 1, the microscope control unit being embodied in such a way that as a result of linkage of the microscope to the mobile user device via the wireless radio interface, as a function of the mobile user device or as a function of an input detection, all microscope settings are reset to the settings most recently utilized with the pertinent mobile user device.

19. The microscope according to claim 1, the microscope control unit being embodied in such a way that image data obtained by way of the microscope are transferred to the mobile user device linked to the microscope via the wireless radio interface, such that an output format of the image data is adaptable to a display format used by the mobile user device.

20. The microscope according to claim 19, the microscope control unit being embodied in such a way that the image data includes a metadata of the microscope image which are transferred to the mobile user device.

21. The microscope according to claim 1, the microscope control unit being embodied in such a way that data proceeding in and out via at least one of the radio systems of the microscope are processed by a service manager or processed by the service manager in order to ascertain availability of internal and external resources or for a version check for synchronization with requirements that a specific application on the mobile user device that is linked to the microscope requests to carry out with the microscope via the wireless radio interface, or for purposes of quality assurance or to ascertain and convey to a central location an operating duration and operating frequency of relevant microscope subassemblies.

22. The microscope according to claim 1, further comprising a microscope-side security manager which is embodied in such a way that access rights to the microscope or to individual components of the microscope are defined such that, for purposes of rental of the microscope, a utilization duration of the microscope or of the individual components of the microscope is measured in order to determine the corresponding fee for the rental of the microscope.

23. A microscope system having at least one microscope in accordance with claim 1, and having at least one mobile user device, or smartphone, tablet Personal Computer (PC), or laptop, wherein control of the at least one microscope is configured to be accomplished at least in part via the at least one mobile user device that is linked via the wireless radio interface to the at least one microscope to which control is to be applied.

24. The microscope system according to claim 23, which is embodied in such a way that multiple microscopes are simultaneously controlled via the at least one mobile user device linked to the respective microscopes.

25. The microscope system according to claim 23, the radio linkage between the microscope and mobile user device being configured to provide one or more of the following features:
- exchange of microscope metadata;
- ability to block a microscope for purposes of control authorization (user rights management);
- permanent linkage of the at least one mobile user device to a specific microscope;
- interaction between the at least one mobile user device and a higher-order manager for controlled manipulation, blockage, querying, or updating of the at least one mobile user device;
- detecting the at least one mobile user device on the basis of radio field strength and automatically establishing a connection between the at least one mobile user device and the microscope.

26. A method for using a microscope system in accordance with claim 23, comprising authenticating a user for the microscope of the microscope system by means of the mobile user device of the user, wherein the mobile user device is linked to the microscope via the at least one radio system having the short range, the authenticating then being accomplished either automatically or by logging in the user.

27. The method according to claim 26, wherein the at least one first radio system having the short range is generated by a short-range microscope-integrated Wireless Local Area Network (WLAN) router.

28. The method according to claim 26, wherein, after authentication of the user, the microscope is linked, via the at least one second radio system having the long range, to at least one device external to the microscope or to a microscope facility infrastructure.

29. The method according to claim 28, wherein the at last one external device is embodied in such a way that it comprises at least computing capacity for furnishing infrastructure of the microscope system or a memory capacity for storing data or image data.

30. The method according to claim 26, wherein data generated during microscope utilization are streamed via a Wireless Local Area Network (WLAN) directly to a cloud into a user directory, in such a way that world-wide data synchronization with devices of users can occur.

31. The method according to claim 26, wherein two mobile user devices in a form of two touch devices are used simultaneously, one of the touch devices being a right-hand touch device located on the right and another one of the touch devices being a left-hand touch device located on the left in such a way that the user can use both hands to operate the microscope to be controlled, such that functions different from those on the left-hand touch device can be controlled on the right-hand touch device.

32. The microscope according to claim 1, wherein the short range is from 1 meter to 3 meter and the long range is greater than 3 meter.

33. The microscope according to claim 1, wherein the microscope control unit is configured to use the short range to authenticate a user of the microscope and to use the long range to subsequently communicate with a central data server to at least one of: download a user-specific setup of the microscope, store microscope settings of the user or acquire microscope image data from the central data server.

* * * * *